(12) United States Patent
Shiono et al.

(10) Patent No.: US 10,598,834 B2
(45) Date of Patent: Mar. 24, 2020

(54) NEAR-INFRARED LIGHT BLOCKING OPTICAL FILTER HAVING HIGH VISIBLE LIGHT TRANSMISSION AND AN IMAGING DEVICE USING THE OPTICAL FILTER

(71) Applicant: AGC Inc., Chiyoda-ku (JP)

(72) Inventors: Kazuhiko Shiono, Koriyama (JP); Keigo Matsuura, Koriyama (JP); Hiroki Hotaka, Koriyama (JP)

(73) Assignee: AGC Inc., Chiyoda-ku (JP)

( * ) Notice: Subject to any disclaimer, the term of this patent is extended or adjusted under 35 U.S.C. 154(b) by 241 days.

(21) Appl. No.: 15/662,482

(22) Filed: Jul. 28, 2017

(65) Prior Publication Data

US 2017/0343710 A1 Nov. 30, 2017

Related U.S. Application Data

(63) Continuation of application No. PCT/JP2016/085793, filed on Dec. 1, 2016.

(30) Foreign Application Priority Data

Dec. 1, 2015 (JP) .................... 2015-235155

(51) Int. Cl.
*G02B 5/20* (2006.01)
*B32B 7/02* (2019.01)
(Continued)

(52) U.S. Cl.
CPC ............. *G02B 5/208* (2013.01); *B32B 7/02* (2013.01); *B32B 27/20* (2013.01); *G02B 1/04* (2013.01);
(Continued)

(58) Field of Classification Search
CPC .......... G02B 5/003; G02B 5/20; G02B 5/205; G02B 5/206; G02B 5/208; G02B 5/22;
(Continued)

(56) References Cited

U.S. PATENT DOCUMENTS 7,192,897 B2 3/2007 Yamane et al.
8,014,071 B2 9/2011 Matsumoto et al.
(Continued)

FOREIGN PATENT DOCUMENTS

CA 2 838 581 A 12/2012
CN 103608705 A 2/2014
(Continued)

OTHER PUBLICATIONS

International Search Report dated Feb. 28, 2017 in PCT/JP2016/085793 filed Dec. 1, 2016 (with English Translation).
(Continued)

*Primary Examiner* — Arnel C Lavarias
(74) *Attorney, Agent, or Firm* — Oblon, McClelland, Maier & Neustadt, L.L.P.

(57) ABSTRACT

An optical filter whose transmitting characteristics for visible light are favorably maintained and at the same time, whose blocking characteristics for near-infrared light, in particular, with a large incident angle deteriorates less. The optical filter includes an absorption layer and a reflection layer, and satisfies the requirements: in a spectral transmittance curve for a 0° incident angle, an average transmittance for 430 to 620 nm wavelength light is 65% or more, and a wavelength exhibiting a 50% transmittance is in a 600 to 700 nm wavelength; in a 615 to 725 nm wavelength, an average value of absolute values of differences in transmittance between the spectral transmittance curve for the 0° incident angle and 30° incident angle is 8%/nm or less; and in a spectral transmittance curve for a 60° incident angle, the maximum transmittance for 730 to 1000 nm wavelength light is 15% or less.

21 Claims, 7 Drawing Sheets

(51) Int. Cl.
 *B32B 27/20* (2006.01)
 *G02B 5/26* (2006.01)
 *G02B 5/28* (2006.01)
 *G02B 5/22* (2006.01)
 *G02B 1/04* (2006.01)

(52) U.S. Cl.
 CPC .............. *G02B 5/223* (2013.01); *G02B 5/26* (2013.01); *G02B 5/28* (2013.01); *B32B 2307/412* (2013.01)

(58) Field of Classification Search
 CPC .......... G02B 5/223; G02B 5/226; G02B 5/26; G02B 5/28; G02B 5/281; G02B 5/282; G02B 5/285; G02B 5/286; G02B 5/287
 USPC ....... 359/359, 350, 355, 360, 361, 577, 580, 359/581, 584, 585, 586, 588, 589, 590, 359/722, 723, 738, 885, 887, 888, 890, 359/891, 892
 See application file for complete search history.

(56) References Cited

U.S. PATENT DOCUMENTS

| | | | |
|---|---|---|---|
| 8,159,596 B2 | 4/2012 | Yamano et al. | |
| 8,693,089 B2 | 4/2014 | Saitoh et al. | |
| 9,575,213 B2* | 2/2017 | Nagaya | G02B 5/208 |
| 9,664,830 B2* | 5/2017 | Hasegawa | G02B 5/281 |
| 2014/0063597 A1 | 3/2014 | Shimmo et al. | |
| 2014/0091419 A1 | 4/2014 | Hasegawa et al. | |
| 2014/0264202 A1 | 9/2014 | Nagaya et al. | |
| 2014/0350146 A1 | 11/2014 | Tsubouchi | |
| 2015/0146057 A1 | 5/2015 | Konishi et al. | |
| 2015/0260889 A1 | 9/2015 | Shiono et al. | |
| 2015/0277002 A1 | 10/2015 | Ezoe et al. | |
| 2015/0285971 A1 | 10/2015 | Nagaya et al. | |
| 2015/0293283 A1 | 10/2015 | Nara et al. | |
| 2016/0195651 A1 | 7/2016 | Yoshioka et al. | |
| 2017/0017023 A1* | 1/2017 | Sugiyama | G02B 5/26 |
| 2017/0017024 A1* | 1/2017 | Hasegawa | G02B 5/22 |
| 2018/0017721 A1* | 1/2018 | Nagaya | G01J 1/02 |
| 2018/0095203 A1* | 4/2018 | Ooi | G02B 5/22 |
| 2018/0364095 A1* | 12/2018 | Nagaya | G01J 1/0488 |

FOREIGN PATENT DOCUMENTS

| | | |
|---|---|---|
| CN | 104838294 A | 8/2015 |
| CN | 105593712 A | 5/2016 |
| JP | 2006-106570 | 4/2006 |
| JP | 2006-301489 | 11/2006 |
| JP | 2008-51985 | 3/2008 |
| JP | 2008-181028 | 8/2008 |
| JP | 2011-100084 | 5/2011 |
| JP | 2012-103340 | 5/2012 |
| JP | 2012-137645 | 7/2012 |
| JP | 2012-137646 | 7/2012 |
| JP | 2012-137647 | 7/2012 |
| JP | 2012-137648 | 7/2012 |
| JP | 2012-137649 | 7/2012 |
| JP | 2012-137650 | 7/2012 |
| JP | 2012-137651 | 7/2012 |
| JP | 5116673 | 1/2013 |
| JP | 2013-29708 | 2/2013 |
| JP | 2013-50593 | 3/2013 |
| JP | 2013-190553 | 9/2013 |
| JP | 5383755 | 1/2014 |
| JP | 2014-28950 | 2/2014 |
| JP | 2014-52482 | 3/2014 |
| JP | 2014-52604 | 3/2014 |
| JP | 2014-59550 | 4/2014 |
| JP | 2014-126642 | 7/2014 |
| JP | 2014-149514 | 8/2014 |
| JP | 2015-60182 | 3/2015 |
| JP | 2015-172102 | 10/2015 |
| JP | 5810604 | 11/2015 |
| JP | 2016-81056 | 5/2016 |
| JP | 2016-90781 | 5/2016 |
| JP | 6020746 | 11/2016 |
| KR | 10-2014-0041528 | 4/2014 |
| KR | 10-2015-0094631 | 8/2015 |
| KR | 10-2015-0106375 | 9/2015 |
| KR | 10-2016-0032038 | 3/2016 |
| WO | WO 2004/082360 A2 | 9/2004 |
| WO | WO 2004/093200 A1 | 10/2004 |
| WO | WO 2007/148621 A1 | 12/2007 |
| WO | WO 2012/169447 A1 | 12/2012 |
| WO | WO 2013/054864 A1 | 4/2013 |
| WO | WO 2013/161492 A1 | 10/2013 |
| WO | WO 2014/002864 A1 | 1/2014 |
| WO | WO 2014/088063 A1 | 6/2014 |
| WO | WO 2014/163405 A1 | 10/2014 |
| WO | WO 2014/168189 A1 | 10/2014 |
| WO | WO 2014/192714 A1 | 12/2014 |
| WO | WO 2014/192715 A1 | 12/2014 |
| WO | WO 2015/022892 A1 | 2/2015 |
| WO | WO 2015/034211 A1 | 3/2015 |
| WO | WO 2015/034217 A1 | 3/2015 |
| WO | WO 2015/054864 A1 | 4/2015 |
| WO | WO 2015/091899 A1 | 6/2015 |
| WO | WO 2015/099060 A1 | 7/2015 |
| WO | WO 2015/122595 A1 | 8/2015 |
| WO | WO 2016/043166 A1 | 3/2016 |

OTHER PUBLICATIONS

Written Opinion dated Feb. 28, 2017 in PCT/JP2016/085793 filed Dec. 1, 2016.

* cited by examiner

NEAR-INFRARED LIGHT BLOCKING OPTICAL FILTER HAVING HIGH VISIBLE LIGHT TRANSMISSION AND AN IMAGING DEVICE USING THE OPTICAL FILTER

CROSS-REFERENCE TO RELATED APPLICATIONS

This application is a continuation of prior International Application No. PCT/JP2016/085793, filed on Dec. 1, 2016 which is based upon and claims the benefit of priority from Japanese Patent Application No. 2015-235155, filed on Dec. 1, 2015; the entire contents of all of which are incorporated herein by reference.

FIELD

The present invention relates to an optical filter that transmits light in the visible wavelength region and blocks light in the near-infrared wavelength region, and an imaging device including the optical filter.

BACKGROUND

Optical filters that sufficiently transmit light in the visible wavelength region (hereinafter, referred to as visible light) while blocking light in the near-infrared wavelength region (hereinafter, referred to as near-infrared light) have recently been used in various applications.

For example, a solid state image sensing device (CCD, CMOS, or the like) is used in an imaging device such as a digital still camera. Further, an optical filter is disposed between an imaging lens and the solid state image sensing device so that the sensitivity of the solid state image sensing device becomes similar to the human visibility.

As an optical filter for imaging devices, it is known a glass filter including near-infrared absorbing glass that selectively absorbs near-infrared light and in which CuO or the like is added to fluorophosphate-based glass or phosphate-based glass. Further, a film made of a transparent resin film containing a dye that absorbs near-infrared light and an optical filter including this film stacked on a glass substrate have been developed.

In order to more accurately block near-infrared light, some of these optical filters include, in addition to the above-described structure, a multilayer film that reflects near-infrared light, in particular, 700 to 1200 nm wavelength light, for instance. It is known, however, that a spectral transmittance curve of the reflective multilayer film shifts because its transmittance varies depending on an incident angle.

Under such circumstances, Patent Reference 1 (International Publication WO2015/054864) discloses an optical filter that achieves a reflectance of 70% or more for 45° incident light in an 800 to 1200 nm wavelength region. That is, in the optical filter of Patent Reference 1, a high reflectance for near-infrared light whose incident angle ranges from 0° to 45° is obtained in a wide band.

SUMMARY

However, in accordance with the performance improvement of imaging devices, there is an increasing demand for an optical filter that can have an appropriate reflectance in a wide band also for stray light whose incident angle is over 45°. The optical filter of Patent Reference 1, however, has a problem that it cannot have a high reflectance in a wide band in the near-infrared region for light whose incident angle is over 45° and it suffers light leakage which means that a transmittance for part of near-infrared light for which the reflectance should be high becomes higher as the incident angle, becomes higher.

It is an object of the present invention to provide an optical filter whose transmitting characteristics for visible light are favorably maintained and at the same time whose blocking characteristics for near-infrared light, in particular, blocking characteristics for near-infrared light having a large incident angle deteriorate less, and an imaging device including the optical filter.

An optical filter according to one aspect of the present invention includes an absorption layer and a reflection layer, the optical filter satisfying the following requirements (i-1) to (i-3):

(i-1) in a spectral transmittance curve for a 0° incident angle, an average transmittance for 430 to 620 nm wavelength light is 65% or more, and a wavelength exhibiting a 50% transmittance is in a 600 to 700 nm wavelength region;

(i-2) in a 615 to 725 nm wavelength region, an average value of absolute values of differences in transmittance between the spectral transmittance curve for the 0° incident angle and a spectral transmittance curve for a 30° incident angle is 8%/nm or less; and (i-3) in a spectral transmittance curve for a 60° incident angle, the maximum transmittance for 730 to 1000 nm wavelength light is 15% or less.

The present invention further provides an imaging device including the optical filter of the present invention.

According to the present invention, it is possible to obtain an optical filter whose transmitting characteristics for visible light are favorably maintained and at the same time whose blocking characteristics for near-infrared light, in particular, blocking characteristics for near-infrared light having a large incident angle deteriorate less, and an imaging device including the optical filter.

DESCRIPTION OF EMBODIMENTS

Embodiments of the present invention will be hereinafter described. In this specification, an optical filter is abbreviated to "NIR filter", a near-infrared absorbing dye to "NIR absorbing dye" or "NIR dye", and an ultraviolet absorbing dye to "UV absorbing dye" or "UV dye".

<NIR Filter>

A NIR filter of one embodiment of the present invention (hereinafter referred to as "the present filter") has an absorption layer and a reflection layer, and the number of the absorption layers in the present filter may be one, or may be two or more. Where the two absorption layers or more are included, these layers may have the same structure or different structures. For example, one of the layers may be a near-infrared absorption layer containing a NIR dye and a transparent resin, and the other layer may be an ultraviolet absorption layer containing a UV dye and a transparent resin. The absorption layer itself may function as a substrate (resin substrate).

The number of the reflection layers in the present filter may be one, or may be two or more. Where the two reflection layers or more are included, these layers may have the same structure or different structures. For example, one of the layers may be a near-infrared reflection layer that reflects at least near-infrared light and the other layer may be an ultraviolet reflection layer that reflects at least ultraviolet light.

The present filter may further include a transparent substrate that exhibits high transmitting characteristics at least for visible light. In this case, the absorption layer and the reflection layer may be on the same main surface or different main surfaces of the transparent substrate. Where the absorption layer and the reflection layer are on the same main surface of the transparent substrate, their stacking order is not limited. The present filter may further include another functional layer such as an antireflection layer that reduces a loss of a transmittance for visible light.

Figure 1A:
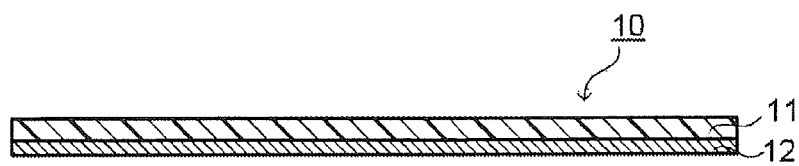
FIG. 1A is a cross-sectional view schematically illustrating an example of an optical filter of one embodiment.
Figure 1B:
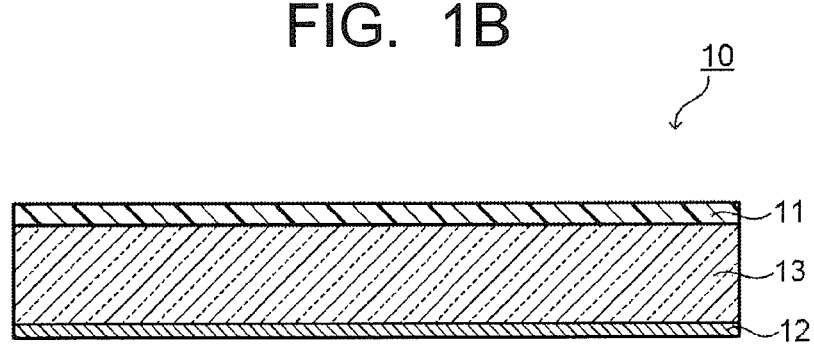
FIG. 1B is a cross-sectional view schematically illustrating another example of the optical filter of the embodiment.

FIG. 1A is a structure example of a NIR filter 10 having a reflection layer 12 on one main surface of an absorption layer 11. Note that "having the reflection layer 12 on (top of) one main surface of the absorption layer 11" is not limited to a case where the reflection layer 12 is provided in contact with the absorption layer 11 but also includes a case where another functional layer is provided between the absorption layer 11 and the reflection layer 12, and the same applies to the following structures. FIG. 1B is a structure example of a NIR filter 10 having an absorption layer 11 on one main surface of a transparent substrate 13 and having a reflection layer 12 on the other main surface of the transparent substrate 13.

Figure 1C:
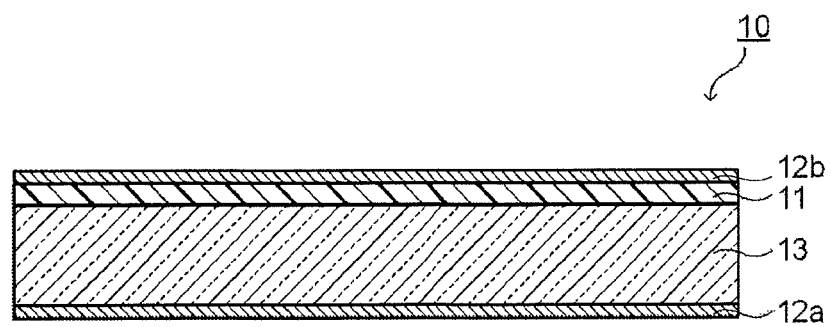
FIG. 1C is a cross-sectional view schematically illustrating another example of the optical filter of the embodiment.
Figure 1D:
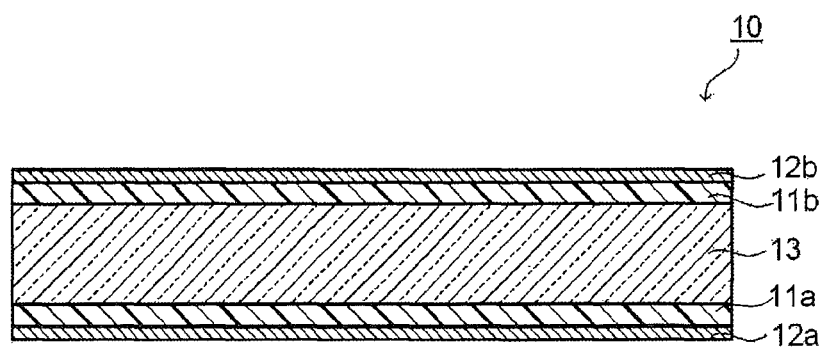
FIG. 1D is a cross-sectional view schematically illustrating another example of the optical filter of the embodiment.

FIG. 1C is a structure example of a NIR filter 10 having an absorption layer 11 on one main surface of a transparent substrate 13 and having reflection layers 12a and 12b on the other main surface of the transparent substrate 13 and on a main surface of the absorption layer 11. FIG. 1D is a structure example of a NIR filter 10 having absorption layers 11a and 11b on both main surfaces of a transparent substrate 13 and having reflection layers 12a and 12b on main surfaces of the absorption layers 11a and 11b.

In FIG. 1C and FIG. 1D, the two combined reflection layers 12a and 12b may be identical or may be different. An example of an adoptable structure is that the reflection layers 12a and 12b have characteristics of reflecting ultraviolet light and near-infrared light and transmitting visible light, the reflection layer 12a reflects ultraviolet light and light in a first near-infrared region, and the reflection layer 12b reflects ultraviolet light and light in a second near-infrared region.

In FIG. 1D, the two absorption layers 11a and 11b may be identical or different. Where the absorption layers 11a and 11b are different, the combination of the absorption layers 11a and 11b may be, for example, a combination of a near-infrared absorption layer and an ultraviolet absorption layer, or a combination of an ultraviolet absorption layer and a near-infrared absorption layer.

Figure 1E:
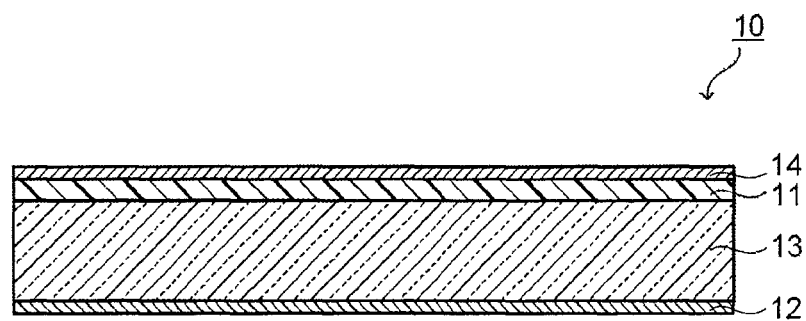
FIG. 1E is a cross-sectional view schematically illustrating another example of the optical filter of the embodiment.

FIG. 1E is a structure example having an antireflection layer 14 on a main surface of the absorption layer 11 of the NIR filter 10 illustrated in FIG. 1B. In the structure where the absorption layer instead of the reflection layer is on the uppermost surface, the antireflection layer is desirably provided on the absorption layer. Incidentally, the antireflection layer may cover the whole side surface of the absorption layer instead of covering only the uppermost surface. This can enhance a moisture-proof effect of the absorption layer.

The present filter satisfies the following requirements (i-1) to (i-3):

(i-1) in a spectral transmittance curve for a 0° incident angle, an average transmittance for 430 to 620 nm wavelength light is 65% or more, and a wavelength exhibiting a 50% transmittance is in a 600 to 700 nm wavelength region;

(i-2) in a 615 to 725 nm wavelength region, an average value of absolute values of differences in transmittance between the spectral transmittance curve for the 0° incident angle and a spectral transmittance curve for a 30° incident angle (hereinafter, referred to as an "transmittance average shift amount of 615 to 725 nm wavelength") is 8%/nm or less; and (i-3) in a spectral transmittance curve for a 60° incident angle, the maximum transmittance for 730 to 1000 nm wavelength light is 15% or less.

Satisfying the requirement (i-1) increases the transmittance for the 430 to 620 nm wavelength light to enhance blue color reproducibility. This also enables the efficient transmission of 600 to 700 nm wavelength light involved in the human visibility while cutting 700 nm or more light not necessary for a solid state image sensing device. Satisfying the requirement (i-2) makes it possible to reduce dependence on the incident angle of light in the 615 to 725 nm wavelength region to reduce incident angle dependence of spectral sensitivity of the solid state image sensing device in this wavelength region. Satisfying the requirement (i-3) makes it possible to sufficiently block the 730 to 1000 nm wavelength light even if the incident angle is large and greatly reduce stray light to the solid state image sensing device, achieving highly accurate color reproducibility.

In the present filter, the average transmittance for the 430 to 620 nm wavelength light in the spectral transmittance curve for the 0° incident angle in (i-1) is preferably 70% or more, more preferably 75% or more, and still more preferably 80% or more. As the average transmittance of the optical filter for the 430 to 620 nm wavelength light is higher, visible light can be taken in more effectively.

In the present filter, the transmittance average shift amount of the 615 to 725 nm wavelength in (i-2) is preferably 6%/nm or less, and more preferably 3%/nm or less. That the value of the transmittance average shift amount of the 615 to 725 nm wavelength is smaller indicates that the incident angle dependence of the present filter is lower.

In the present filter, the maximum transmittance for the 730 to 1000 nm wavelength light in the spectral transmittance curve for the 60° incident angle in (i-3) is preferably 10% or less, and more preferably 5% or less. As this value is smaller, the 730 to 1000 nm wavelength light can be sufficiently blocked even if the incident angle is large.

Preferably, the present filter further satisfies the following requirement (i-4):

(i-4) in a 380 to 425 nm wavelength region, an average value of absolute values of differences in transmittance between the spectral transmittance curve for the 0° incident angle and the spectral transmittance curve for the 30° incident angle (hereinafter, referred to as an "transmittance average shift amount of 380 to 425 nm wavelength") is 8%/nm or less.

In the present filter, the transmittance average shift amount of 380 to 425 nm wavelength in (i-4) is more preferably 6%/nm or less, and still more preferably 5%/nm or less. That the transmittance average shift amount of 380 to 425 nm wavelength is smaller indicates that the incident angle dependence of the present filter is lower.

The present filter preferably further satisfies one selected from the following requirements (i-5) to (i-7), more preferably satisfies two or more of these requirements, and especially preferably satisfies all of these requirements:

(i-5) in the spectral transmittance curve for the 0° incident angle, a wavelength exhibiting a 50% transmittance is in a 400 to 425 nm wavelength region;

(i-6) in the spectral transmittance curve for the 0° incident angle, an average transmittance for 350 to 395 nm wavelength light is 2% or less; and (i-7) in the spectral transmittance curve for the 0° incident angle, an average transmittance for 710 to 1100 nm wavelength light is 2% or less.

In the present filter, the average transmittance for the 350 to 395 nm wavelength light in the spectral transmittance curve for the 0° incident angle in (i-6) is more preferably 1.5% or less, more preferably 1% or less, and especially preferably 0.5% or less. As the average transmittance for the light in this wavelength region is lower, light of wavelengths not necessary for the solid state image sensing device can be cut more.

In the present filter, the average transmittance for the 710 to 1100 nm wavelength light in the spectral transmittance curve for the 0° incident angle in (i-7) is more preferably 1% or less, still more preferably 0.5% or less, and especially preferably 0.3% or less. As the average transmittance for the light in this wavelength region is lower, light of wavelengths not necessary for the solid state image sensing device can be cut more.

Next, the transparent substrate, the absorption layer, the reflection layer, and the antireflection layer of the present filter will be described.

[Transparent Substrate]

The transparent substrate may be made of any material that transmits visible light, and its form may be any of a block form, a plate form, and a film form. The thickness of the transparent substrate is preferably 0.03 to 5 mm, and in view of thickness reduction, is more preferably 0.05 to 1 mm.

Examples of a resin usable for the transparent substrate include polyester resins such as polyethylene terephthalate and polybutylene terephthalate; polyolefin resins such as polyethylene, polypropylene, and an ethylene-vinyl acetate copolymer; norbornene resins; acrylic resins such as polyacrylate, and polymethyl methacrylate; urethane resins; vinyl chloride resins; fluorocarbon resins; polycarbonate resins, polyvinyl butyral resins, polyimide resins; polyamide-imide resins; and polyvinyl alcohol resins; and the like.

Examples of glass usable for the transparent substrate include absorptive glass (near-infrared absorbing glass) in which CuO or the like is added to fluorophosphate-based glass, phosphate-based glass, or the like, soda lime glass, borosilicate glass, non-alkali glass, quartz glass, and the like. Note that "phosphate-based glass" includes a silicophosphate glass in which part of the skeleton of the glass is constituted of $SiO_2$. In the present filter, where the transparent substrate is the near-infrared absorbing glass, the transparent substrate may be the absorption layer.

Examples of a crystal material usable for the transparent substrate include birefringent crystals such as crystalline quartz, lithium niobate, and sapphire. The transparent substrate desirably has such optical characteristics as to cause the NIR filter obtained by stacking the absorption layer, the reflection layer, and so on described below to have the aforesaid optical characteristics.

When the absorption layer is stacked on the main surface of the transparent substrate, the stacking surface of the transparent substrate may be surface-treated with a silane coupling agent. The transparent substrate surface-treated with the silane coupling agent can have increased adhesion to the absorption layer.

[Absorption Layer]

The absorption layer has a layer containing a near-infrared absorbing dye (A) (hereinafter, also referred to as a "dye (A)") and a transparent resin (B), or has a glass layer whose minimum transmittance is 80% or less for a wavelength in a 750 to 900 nm wavelength region. The absorption layer may have both the layer containing the dye (A) and the glass layer having the aforesaid absorption characteristics. The absorption layer is typically a layer or a substrate in which the dye (A) is uniformly dissolved or dispersed in the transparent resin (B). The absorption layer preferably further contains an ultraviolet absorbing dye (U) (hereinafter, also referred to as a "dye (U)"). In the present filter, the absorption layer may be, for example, an absorption layer composed of a plurality of layers which are the layer containing the dye (A) and, as the other layer, a layer containing the dye (U).

The absorption layer only needs to be formed so as to cause the present filter to satisfy the above requirements (i-1) to (i-3) when the absorption layer is combined with the reflection layer to form the present filter. As the absorption layer itself, its spectral transmittance curve for a 0° incident angle preferably satisfies the following (iv-1) to (iv-3):

(iv-1) a transmittance for 700 nm wavelength light is 5% or less;

(iv-2) the minimum transmittance for 780 to 860 nm wavelength light is 50% or less; and (iv-3) an average transmittance for 430 to 460 nm wavelength light is 60% or more.

The present filter composed of the combination of the absorption layer satisfying (iv-1) and (iv-2) and the reflection layer has blocking characteristics for predetermined near-infrared light and its incident angle dependence can be fully reduced. The transmittance for the 700 nm wavelength light at the 0° incident angle (iv-1) in the absorption layer is more preferably 3% or less, and still more preferably 1% or less. The minimum transmittance for the 780 to 860 nm wavelength light (iv-2) is more preferably 45% or less, and still more preferably 40% or less.

The requirement (iv-3) in the absorption layer is relevant to transmitting characteristics for part of visible light. Further, in order for the present filter to satisfy the above requirement (i-1), the absorption layer has optical characteristics that its average transmittance for 430 to 620 nm wavelength light at a 0° incident angle is 65% or more. Further, by the absorption layer satisfying the requirement (iv-3), the transmittance of the present filter for the 430 to 460 nm wavelength light can be increased. In the absorption layer, the average transmittance for the 430 to 460 nm wavelength light at the 0° incident angle (iv-3) is more preferably 65% or more, and still more preferably 68% or more.

The thickness of the absorption layer is preferably 0.1 to 100 μm, and where the absorption layer is composed of the plural layers, the total thickness of the layers may be 0.1 to 100 μm. If the thickness is less than 0.1 μm, it may not be possible to fully exhibit the desired optical characteristics, and if the thickness is more than 100 μm, planarity of the layer decreases, and in-plane variation of absorptance may occur. The thickness of the absorption layer is more preferably 0.3 to 50 μm. Where the other functional layer such as the antireflection layer is provided, depending on its material, too large a thickness of the absorption layer may cause a crack or the like. In view of these points, the thickness of the absorption layer is preferably 0.3 to 10 μm.

(Near-Infrared Absorbing Dye (A))

The dye (A) contained in the absorption layer of the present filter preferably contains a dye (D1) whose light absorption spectrum measured when the dye (D1) is dissolved in dichloromethane satisfies the following requirements (ii-1) and (ii-2). The dye (D1) may be composed of one kind or may be composed of two kinds or more.

(ii-1) at least one absorption maximum wavelength is in a 760 to 875 nm wavelength region; and (ii-2) when a transmittance for the largest absorption wavelength in the 760 to 875 nm wavelength region is 10%, a wavelength exhibiting an 80% transmittance is in a 650 to 800 nm wavelength region.

Even if the combined reflection layer transmits part of near-infrared light having a large incident angle, the absorption layer containing the dye (D1) satisfying the requirements (ii-1) and (ii-2) can satisfyingly absorb the transmitted light, making it possible to reduce what is called light leakage which is the appearance of a transmission band due to the reflection layer. More specifically, satisfying the requirement (ii-1) makes it possible to effectively reduce the light leakage with a smaller addition amount. Satisfying the requirement (ii-2) makes it possible to prevent a loss of a transmittance for 590 to 630 nm wavelength light necessary for the solid state image sensing device.

The use of the dye (D1) satisfying the requirements (ii-1) and (ii-2) in the absorption layer enables the present filter to satisfy, in particular, the requirement (i-3). The dye (A) may be made of only the dye (D1), as long as the present filter in which the absorption layer containing the dye (D1) and the reflection layer are combined satisfies all the requirements (i-1) to (i-3).

In combination with the dye (D1), the dye (A) preferably contains a dye (D2) satisfying the following requirement (iii-1) as a dye that helps effectively achieve the requirements (i-1) to (i-3):

(iii-1) in a 350 to 800 nm wavelength light absorption spectrum measured when the dye (D2) is dissolved in dichloromethane, the largest absorption wavelength is in a 600 to 750 nm wavelength region. The dye (D1) and the dye (D2) will be hereinafter described.

The molecular structure of the dye (D1) is not limited, as long as it satisfies the requirements (ii-1) and (ii-2). A specific example thereof is at least one kind of dye selected from a group consisting of a cyanine-based compound, a cloconium-based compound, a phthalocyanine-based compound, a squarylium-based compound, and a diketopyrrolopyrrole-based compound.

Examples of the dye (D1) include cyanine-based compounds such as compounds represented by the formula (D1-1) and compounds represented by the formula (D1-2). In this specification, the dye represented by the formula (D1-1) is also referred to as a compound (D1-1) or a dye (D1-1), and the same applies to the other dyes. For example, a group represented by the formula (A1) is referred to as a group (A1), and groups in the other formulas are referred to in the same manner. The dye (D1) is preferably the dye (D1-1) because it does not cause a decrease in a 430 to 460 nm visible transmittance and because the addition of even a small amount of the dye (D1-1) to the absorption layer efficiently reduces light leakage when the incident angle is large.

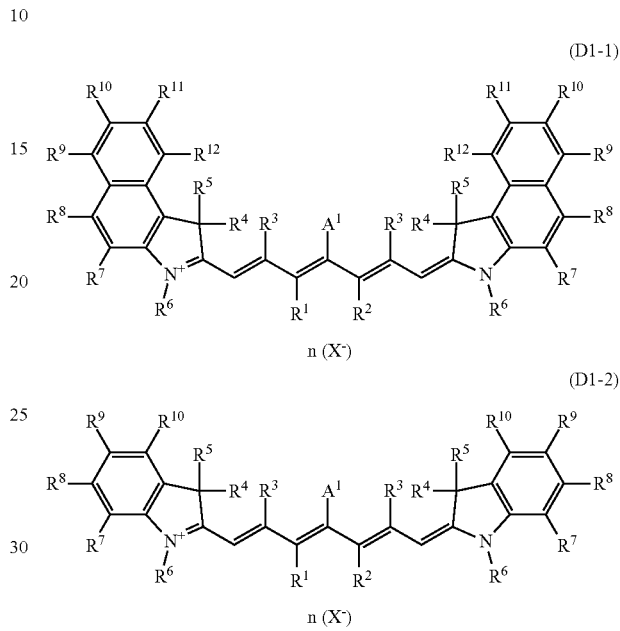

The symbols in the formula (D1-1) and the formula (D1-2) represent as follows.

$R^1$ to $R^{12}$ each independently represent a hydrogen atom, a halogen atom, an alkyl group having 1 to 15 carbon atoms which may have a substituent, or an aryl group having 5 to 20 carbon atoms;

$R^1$ and $R^2$ may couple together to form a 5-membered ring, a 6-membered ring, or a 7-membered ring, and preferably form a ring. In this case, a hydrogen atom bonded to a carbon ring may be substituted by an alkyl group having 1 to 20 carbon atoms or an aryl group having 6 to 30 carbon atoms; and $X^-$ represents a monovalent anion, and n represents the number of $X^-$ and is 0 or 1.

When n is 0, $A^1$ represents an anionic group represented by one selected from the formulas (A1) to (A6). When n is 1, $A^1$ represents a halogen atom or $-X-A^2$ (X is a single bond, an ether bond (—O—), a sulfonyl bond (—SO$_2$—), an ester bond (—C(=O)—O— or —O—C(=O)—), or a ureide bond (—NH—C(=O)—NH—), and $A^2$ is an alkyl group having 1 to 20 carbon atoms or an aryl group having 6 to 30 carbon atoms).

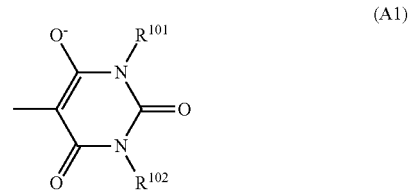

-continued

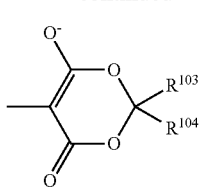
(A2)

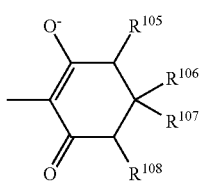
(A3)

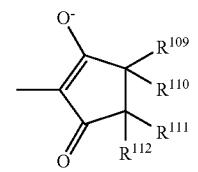
(A4)

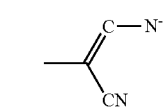
(A5)

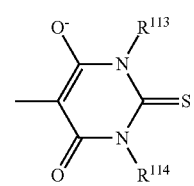
(A6)

In the formulas (A1) to (A6), $R^{101}$ to $R^{114}$ each represent a hydrogen atom, an aryl group having 5 to 20 carbon atoms, or an alkyl group having 1 to 10 carbon atoms which may have a substituent.

In the above, the alkyl group may be straight-chained or may include a branch structure or a saturated ring structure. The aryl group refers to a group bonded via a carbon atom which is a constitutional element of an aromatic ring, for example, a benzene ring, a naphthalene ring, biphenyl, a furan ring, a thiophene ring, or a pyrrole ring, that an aromatic compound has.

In the formula (D1-1) and the formula (D1-2), $R^3$ and $R^7$ to $R^{12}$ each independently represent preferably a hydrogen atom, an alkyl group having 1 to 15 carbon atoms, or an aryl group having 5 to 20 carbon atoms, and the hydrogen atom is more preferable in view of that it contributes to a high visible light transmittance.

Preferably, $R^4$ and $R^5$ is each independently a hydrogen atom, an alkyl group having 1 to 15 carbon atoms (it may be cyclic or branched, and may include a ring structure), or an aryl group having 5 to 20 carbon atoms (it may include a linear, cyclic, or branched alkyl group), and the hydrogen atom or the alkyl group having 1 to 15 carbon atoms is more preferable. Further, $R^4$ and $R^5$ are preferably identical groups. $R^6$ is preferably an alkyl group having 1 to 15 carbon atoms or an aryl group having 5 to 20 carbon atoms, and in view of maintaining a high visible light transmittance in the transparent resin (B) as in a solution, the alkyl group having 1 to 15 carbon atoms with a branch structure is more preferable.

Examples of $X^-$ include $I^-$, $PF_6^-$, $ClO_4^-$, anions represented by the formula (X1) or (X2), and the like, and a preferable example is $I^-$ or $PF_6^-$. The dye (D1-1) and the dye (D1-2) which have $X^-$ will be hereinafter referred to as an external salt-type dye (D1-1) and an external salt-type dye (D1-2).

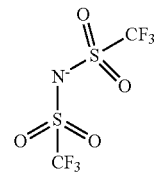
(X1)

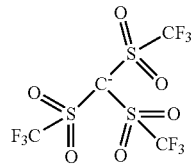
(X2)

In the formula (D1-1) and the formula (D1-2), preferably, there is no $X^-$ but instead $A^1$ is the anionic group represented by one selected from the formulas (A1) to (A6). Hereinafter, a dye (D1-1) and a dye (D1-2) in which there is no $X^-$ but instead $A^1$ is the anionic group will be referred to as an internal salt-type dye (D1-1) and an internal salt-type dye (D1-2).

$A^1$ is preferably the group (A1) in view of light fastness, heat resistance, and further solubility. In the group (A1), $R^{101}$ and $R^{102}$ each are especially preferably an alkyl group having 1 to 6 carbon atoms, and its specific examples include a methyl group, an ethyl group, an n-propyl group, an isopropyl group, an n-butyl group, an isobutyl group, a tert-butyl group, and the like. Further, $R^{101}$ and $R^{102}$ are preferably identical.

The internal salt-type dye (D1-1) and the internal salt-type dye (D1-2) are advantageous in terms of light fastness over the dye (D1-1) and the dye (D1-2) that have $X^-$. The dye (D1-11) represented by the formula (D1-11) out of the internal salt-type dyes (D1-1) is especially preferable in terms of spectral characteristics.

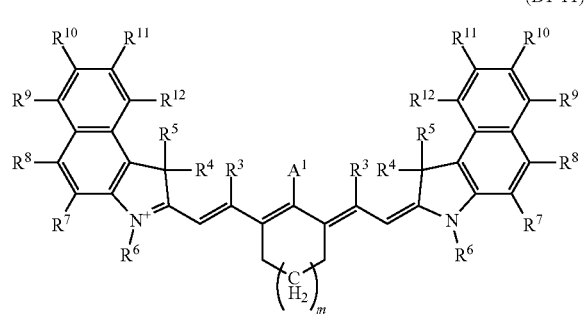

(D1-11)

The symbols in the formula (D1-11) represent as follows. $R^3$ to $R^{12}$ each independently represent a hydrogen atom, a halogen atom, or an alkyl group having 1 to 10 carbon atoms which may have a substituent. Preferably, $R^3$ and $R^7$ to $R^{12}$ each independently a hydrogen atom or an alkyl group having 1 to 10 carbon atoms, and the hydrogen atom is more preferable in view of that it contributes to a high visible light transmittance. Preferably, $R^4$ and $R^5$ is each independently a hydrogen atom or an alkyl group having 1 to 10 carbon atoms (it may be cyclic or branched, or may include a ring structure), and the hydrogen atom or the alkyl group having 1 to 10 carbon atoms is more preferable. Further, $R^4$ and $R^5$ are preferably identical groups. $R^6$ is preferably an alkyl group having 1 to 10 carbon atoms, and in view of maintaining a high visible light transmittance in the transparent resin (B) as in a solution, the alkyl group having 1 to 10 carbon atoms with a branch structure is more preferable.

In the formula, m represents an integer from 0 to 2, and a carbon ring including —$(CH_2)_m$— is a 5-membered ring when m is 0, a 6-membered ring when m is 1, and a 7-membered ring when m is 2. The carbon ring including —$(CH_2)_m$— is preferably the 5-membered ring or the 6-membered ring in view of easy synthesis, solubility, heat resistance, and further a high visible light transmittance and controllability of the requirements (ii-1) and (ii-2). A hydrogen atom bonded to the carbon ring including —$(CH_2)_m$— may be substituted by an alkyl group having 1 to 20 carbon atoms or an aryl group having 6 to 30 carbon atoms.

$A^1$ is one selected from the group (A1) to the group (A6), and its preferable form is the same as that in the formula (D1-1) and the formula (D1-2). More specific examples of the dye (D1-1) include dyes having the structures shown in Table 1. In Table 1, the dyes (D1-11-1) to (D1-11-9), which are dyes represented by the internal salt-type formula (D1-11), are especially preferable. The dyes (D1-12-1) to (D1-12-5) are the external salt-type dyes (D1-1).

More specific examples of the dye (D1-2) include dyes having the structures shown in Table 2. In Table 2, the dye (D1-21-1) is the internal salt-type dye (D1-2), and the dyes (D1-22-1) to (D1-22-6) are the external salt-type dyes (D1-2).

In Table 1 and Table 2, "Me" stands for a methyl group, "Et" for an ethyl group, "iPro" for an isopropyl group, "nBu" for an n-butyl group, "tBu" for a tert-butyl group, and "Ph" for a phenyl group. Hereinafter, when these abbreviations are used in this specification, they mean the same as above. Further, "(A11)" represents a group that is the group (A1) whose $R^{101}$ and $R^{102}$ are both methyl groups, and "(A12)" represents a group that is the group (A1) in which $R^{101}$ and $R^{102}$ are both n-propyl groups.

TABLE 1

| Dye abbreviation | $R^1$ | $R^2$ | $R^3$ | $R^4$ | $R^5$ | $R^6$ | $R^7$ | $R^8$ | $R^9$ | $R^{10}$ | $R^{11}$ | $R^{12}$ | $A^1$ | n | $X^-$ |
|---|---|---|---|---|---|---|---|---|---|---|---|---|---|---|---|
| D1-11-1 | —$(CH_2)_2$— | | H | Me | Me | Me | H | H | H | H | H | H | (A11) | 0 | — |
| D1-11-2 | —$(CH_2)_3$— | | H | Me | Me | Me | H | H | H | H | H | H | (A11) | 0 | — |
| D1-11-3 | —$(CH_2)_3$— | | H | Me | Me | Me | H | H | H | H | H | H | (A12) | 0 | — |
| D1-11-4 | —$(CH_2)_3$— | | H | Me | Me | Et | H | H | H | H | H | H | (A11) | 0 | — |
| D1-11-6 | —$(CH_2)_3$— | | H | Me | Me | iPro | H | H | H | H | H | H | (A11) | 0 | — |
| D1-11-7 | —$CH_2$—CHEt—$CH_2$— | | H | Me | Me | iPro | H | H | H | H | H | H | (A11) | 0 | — |
| D1-11-8 | —$CH_2$—CHPh—$CH_2$— | | H | Me | Me | iPro | H | H | H | H | H | H | (A11) | 0 | — |
| D1-11-9 | —$CH_2$—CHtBu—$CH_2$— | | H | Me | Me | iPro | H | H | H | H | H | H | (A11) | 0 | — |
| D1-12-1 | —$(CH_2)_2$— | | H | Me | Me | Me | H | H | H | H | H | H | Cl | 1 | $I^-$ |
| D1-12-2 | —$(CH_2)_3$— | | H | Me | Me | Me | H | H | H | H | H | H | Cl | 1 | $I^-$ |
| D1-12-3 | —$(CH_2)_2$— | | H | Me | Me | iPro | H | H | H | H | H | H | Cl | 1 | $I^-$ |
| D1-12-4 | —$(CH_2)_3$— | | H | Me | Me | iPro | H | H | H | H | H | H | Cl | 1 | $I^-$ |
| D1-12-5 | —$(CH_2)_3$— | | H | Me | Me | iPro | H | H | H | H | H | H | Ph | 2 | $I^-$ |

TABLE 2

| Dye abbreviation | $R^1$ | $R^2$ | $R^3$ | $R^4$ | $R^5$ | $R^6$ | $R^7$ | $R^8$ | $R^9$ | $R^{10}$ | $A^1$ | n | $X^-$ |
|---|---|---|---|---|---|---|---|---|---|---|---|---|---|
| D1-21-1 | —$(CH_2)_2$— | | H | Me | Me | Me | H | H | H | H | (A11) | 0 | — |
| D1-22-1 | —$(CH_2)_2$— | | H | Me | Me | Et | H | H | H | H | Cl | 1 | $I^-$ |
| D1-22-3 | —$(CH_2)_2$— | | H | Me | Me | Et | H | H | H | H | —$(SO_2)$—Me | 1 | $I^-$ |
| D1-22-4 | —$(CH_2)_2$— | | H | Me | Me | Et | H | H | H | H | —$(SO_2)$—Ph | 1 | $I^-$ |
| D1-22-6 | —$(CH_2)_3$— | | H | Me | Me | nBu | H | H | H | H | Ph | 1 | $PF_6^-$ |

Examples of the cyanine-based compound being the dye (D1) other than the dyes (D1-1) and (D1-2) include SD-AG01 (brand name, manufactured by Sumitomo Seika Chemicals Co., Ltd.), and so on. The dyes (D1-1) and (D1-2) can be manufactured by the method described in Dyes and pigments 73 (2007) 344-352, for instance. As the dye (D1-11-4), the dye (D1-21-1), and the dye (D1-22-6), commercially available S2265, S0322, and S2138 (all of them are brand names and manufactured by FEW Chemicals GmbH) are usable respectively.

Examples of the dye (D1) other than the aforesaid cyanine-based compound include a compound represented by the following formula (hereinafter referred to as "CroPy1" as the cloconium-based compound, FDN-002 and FDN-015 (the both are brand names and manufactured by Yamada Chemical Co., Ltd.) as the phthalocyanine-based compound, and the like. Cropy1 can be manufactured by a conventionally known method.

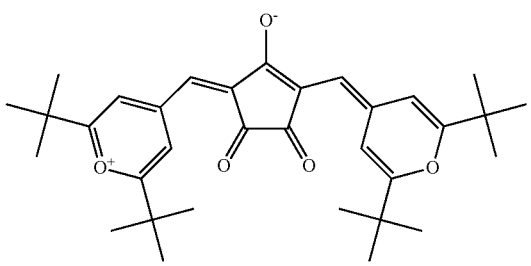 [SMILES: CC(C)(C)C1=CC(=CC2=C([O-])/C(=C/c3cc(C(C)(C)C)[o+]c(C(C)(C)C)c3)C(=O)C2=O)C=C(C(C)(C)C)O1]

As for each of the dyes classified as the dye (D1), Table 3 shows the largest absorption wavelength ($\lambda_{max}$) in a 350 to 1200 nm wavelength light absorption spectrum measured when the dyes are dissolved in dichloromethane. In the dyes shown in Table 3, at least one absorption maximum wavelength in the requirement (ii-1) corresponds with $\lambda_{max}$ in the aforesaid light absorption spectrum. Table 3 also shows a wavelength ($\lambda_{80}$) on a shorter wavelength side than $\lambda_{max}$, for which an 80% transmittance is exhibited when the transmittance for the $\lambda_{max}$ is 10%, a difference between $\lambda_{max}$ and $\lambda_{80}$, and an average 430 to 460 nm wavelength transmittance (%). In Table 3, "Cy-based" represents cyanine-based, "Co-based" represents cloconium-based, and "Pc-based" represents phthalocyanine-based. In the measurement of the light absorption spectrum, commercially available products were used as the dyes indicated by the brand names (manufacturers), and synthesized dyes were used as the dyes not indicated by the brand names (manufacturers) in Table 3.

The light absorption spectrum can be measured using, for example, a ultraviolet and visible light spectrophotometer (manufactured by Hitachi High-Technologies Corporation, U-4100 type). In this specification, the light absorption spectra of the dyes are measured at the 0° incident angle unless otherwise specified. The same applies to the absorption layer.

TABLE 3

| Classification | Dye abbreviation | $\lambda_{max}$ [nm] | $\lambda_{80}$ [nm] | $\lambda_{max} - \lambda_{80}$ [nm] | 430 to 460 nm average transmittance[%] | Brand name (manufacturer) |
|---|---|---|---|---|---|---|
| Cy-based | D1-11-1 | 818 | 684 | 134 | 96.8 | |
| | D1-11-2 | 785 | 688 | 97 | 93.1 | |
| | D1-11-3 | 783 | 683 | 100 | 95.3 | |
| | D1-11-4 | 788 | 691 | 97 | 95.6 | S2265(FEW Chemicals) |
| | D1-11-6 | 789 | 693 | 96 | 95.6 | |
| | D1-11-7 | 789 | 693 | 96 | 95.6 | |
| | D1-11-8 | 789 | 694 | 95 | 95.6 | |
| | D1-11-9 | 789 | 693 | 96 | 95.0 | |
| | D1-12-1 | 849 | 741 | 108 | 96.2 | |
| | D1-12-2 | 824 | 719 | 105 | 96.4 | |
| | D1-12-3 | 852 | 743 | 109 | 96.3 | |
| | D1-12-4 | 826 | 722 | 104 | 96.7 | |
| | D1-12-5 | 802 | 707 | 95 | 96.6 | |
| | D1-21-1 | 770 | 674 | 96 | 98.8 | S0322(FEW Chemicals) |
| | D1-22-1 | 809 | 713 | 96 | 94.9 | |
| | D1-22-3 | 867 | 748 | 119 | 97.5 | |
| | D1-22-4 | 874 | 754 | 120 | 97.4 | |
| | D1-22-6 | 767 | 683 | 84 | 97.2 | S2138(FEW Chemicals) |
| | SD-AG01 | 871 | 741 | 130 | 93.1 | SD-AG01(Sumitomo Seika Chemicals Co., Ltd.) |
| Co-based | CroPy1 | 845 | 771 | 74 | 91.2 | |
| Pc-based | FDN-002 | 802 | 662 | 140 | 89.1 | FDN-002(Yamada Chemical Co., Ltd.) |
| | FDN-015 | 819 | 689 | 130 | 90.1 | FDN-015(Yamada Chemical Co., Ltd.) |

The dyes shown in Table 3 are the dyes (D1) satisfying the aforesaid requirements (ii-1) and (ii-2), and at least one absorption maximum wavelength corresponding to the requirement (ii-1), that is, $\lambda_{max}$ in Table 3 is preferably in a 780 to 850 nm wavelength region and more preferably in a 790 to 850 nm wavelength region. Further, $\lambda_{80}$ corresponding to the requirement (ii-2) is preferably in a 680 to 800 nm wavelength region, more preferably in a 700 to 800 nm wavelength region, and still more preferably in a 720 to 800 nm wavelength region. When $\lambda_{80}$ is in this range, it is possible to reduce light leakage, and efficiently cut the near-infrared region without impairing a transmittance for a wavelength region shorter than 630 nm which region influences the human visibility. An average transmittance (%) for the visible region, in particular, a 430 to 460 nm wavelength region, is preferably 92% or more, and more preferably 93% or more.

When the optical characteristics (high visible light transmittance and controllability of the requirements (ii-1) and (ii-2)) and durability such as light fastness are comprehensively evaluated, as the dye (D1), the dyes (D1-11-1) to (D1-11-9) are preferable, and the dye (D1-11-6) to the dye (D1-11-9) are especially preferable among the aforesaid dyes.

Figure 2:
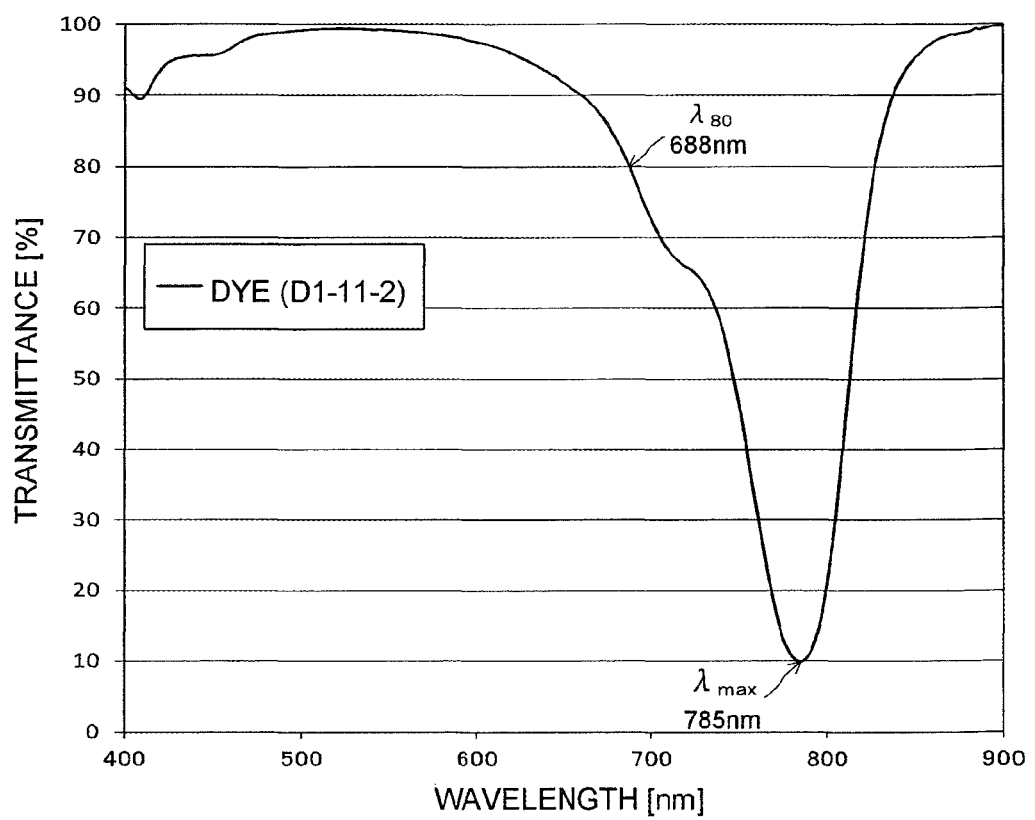
FIG. 2 is a chart illustrating a spectral transmittance curve of a NIR dye used in an optical filter of an example.

FIG. 2 illustrates a spectral transmittance curve, which is depicted by the solid line, of the dye (D1-11-2) shown in Table 3, which is one example of the dye (D1) satisfying the aforesaid requirements (ii-1) and (ii-2), when its transmittance for the largest absorption wavelength in a 760 to 875 nm wavelength region is 10% in a light absorption spectrum measured when the dye (D1-11-2) is dissolved in dichloromethane. As illustrated in FIG. 2, $\lambda_{max}$ of the dye (D1-11-2) is measured as 785 nm and its $\lambda_{80}$ is measured as 688 nm. This is also the same with the other dyes.

The molecular structure of the dye (D2) contained in the dye (A) is not limited, as long as it satisfies the aforesaid requirement (iii-1). $\lambda_{max}$ of the dye (D2) in its light absorption spectrum in the aforesaid requirement (iii-1) is more preferably in a 680 to 725 nm wavelength region. Further, in the light absorption spectrum of the dye (D2), a gradient on a visible light side of an absorption peak having an absorption apex at $\lambda_{max}$ (hereinafter, referred to as a "$\lambda_{max}$ absorption peak") is preferably steep. Further, a gradient on a longer wavelength side of the $\lambda_{max}$ absorption peak is preferably gentle.

The dye (D2) may be at least one kind of dye selected from a group consisting of a cyanine-based compound, a phthalocyanine-based compound, a naphthalocyanine-based compound, a dithiol metal complex-based compound, a diimonium-based compound, a polymethine-based compound, a phthalide-based compound, a naphthoquinone-based compound, an anthraquinone-based compound, an indophenol-based compound, and a squarylium-based compound, that satisfies the requirement (iii-1).

Among them, the squarylium-based compound, the cyanine-based compound, and the phthalocyanine-based compound that satisfy the requirement (iii-1) are more preferable, and the squarylium-based compound is especially preferable. In the aforesaid absorption spectrum, the dye (D2) consisting of the squarylium-based compound has a little absorption of visible light, and the $\lambda_{max}$ absorption peak has a steep gradient on the visible light side, and in addition, this dye (D2) has high preservation stability and high stability to light. In the aforesaid absorption spectrum, the dye (D2) consisting of the cyanine-based compound has a little absorption of visible light, and its absorptance for light on the longer wavelength side near $\lambda_{max}$ is high.

Further, the cyanine-based compound is inexpensive and it can have long-term stability by salifying. The dye (D2) consisting of the phthalocyanine-based compound is excellent in heat resistance and weather resistance.

Specific examples of the dye (D2) that is the squarylium-based compound include a squarylium-based compound (D2-1) represented by the formula (D2-1).

The compound (D2-1) has a structure in which benzene rings bond to the left and right of a squarylium skeleton, nitrogen atoms further bond to 4-positions of the benzene rings, and saturated heterocycles including the nitrogen atoms are formed, and has the aforesaid light absorption characteristics as the dye (D2). In the compound (D2-1), substituents of the benzene rings can be appropriately adjusted within the following range according to other required characteristics such as enhanced solubility in a solvent used when the near-infrared absorption layer is formed (hereinafter, sometimes referred to as a "host solvent") or the transparent resin (B).

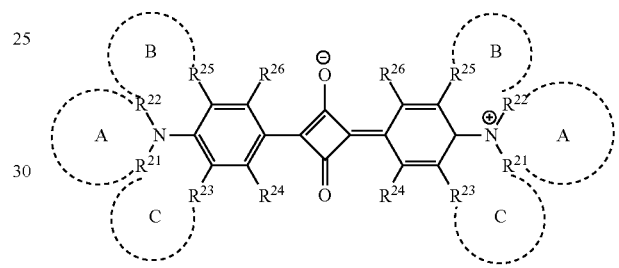

(D2-1)

The symbols in the formula (D2-1) represent as follows. $R^{24}$ and $R^{26}$ each independently represent a hydrogen atom, a halogen atom, a hydroxyl group, an alkyl group or alkoxy group having 1 to 6 carbon atoms, an acyloxy group having 1 to 10 carbon atoms, —$NR^{27}R^{28}$ ($R^{27}$ and $R^{28}$ each independently represent a hydrogen atom, an alkyl group having 1 to 20 carbon atoms, —C(=O)—$R^{29}$ ($R^{29}$ is a hydrogen atom, an alkyl group having 1 to 20 carbon atoms or an aryl group having 6 to 11 carbon atoms which may have a substituent, or an alaryl group having 7 to 18 carbon atoms which may have a substituent and which may have an oxygen atom between carbon atoms), —$NHR^{30}$, or —$SO_2$—$R^{30}$ ($R^{30}$ each is a hydrocarbon group having 1 to 25 carbon atoms in which one or more hydrogen atoms may be substituted by a halogen atom, a hydroxyl group, a carboxy group, a sulfo group, or a cyano group and in which an unsaturated bond, an oxygen atom, or a saturated or unsaturated ring structure may be included between carbon atoms)), or a group represented by the formula (S) ($R^{41}$ and $R^{42}$ each independently represent a hydrogen atom, a halogen atom, or an alkyl group or alkoxy group having 1 to 10 carbon atoms, and k is 2 or 3).

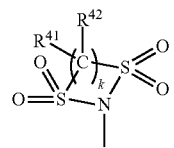

(S)

At least one group of $R^{21}$ and $R^{22}$, $R^{22}$ and $R^{25}$, and $R^{21}$ and $R^{23}$ couple together to form a heterocycle A, a heterocycle B, or a heterocycle C having 5 or 6 members including a nitrogen atom. $R^{21}$ and $R^{22}$ when the heterocycle A is formed represent, as a bivalent group -Q- in which they are bonded, an alkylene group or an alkyleneoxy group, in which a hydrogen atom may be substituted by an alkyl group having 1 to 6 carbon atoms, an aryl group having 6 to 10 carbon atoms, or an acyloxy group having 1 to 10 carbon atoms which may have a substituent.

$R^{22}$ and $R^{25}$ when the heterocycle B is formed and $R^{21}$ and $R^{23}$ when the heterocycle C is formed represent, each as a bivalent group —$X^1$—$Y^1$— and —$X^2$—$Y^2$— in which they are bonded (the side bonded to nitrogen is $X^1$ or $X^2$), a group in which each of $X^1$ and $X^2$ is represented by the following formula (1x) or (2x) and a group in which each of $Y$ and $Y^2$ is represented by one selected from the following formulas (1y) to (5y), and when each of $X^1$ and $X^2$ is a group represented by the following formula (2x), $Y^1$ and $Y^2$ may each be a single bond, in which case $X^1$ and $X^2$ may have an oxygen atom between carbon atoms.

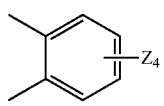

(1x)

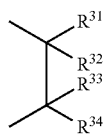

(2x)

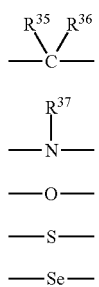

(1y)

(2y)

(3y)

(4y)

(5y)

In the formula (1x), four Zs in the formula (1x) each independently represent a hydrogen atom, a hydroxyl group, an alkyl group or alkoxy group having 1 to 6 carbon atoms, or —$NR^{38}R^{39}$ ($R^{38}$ and $R^{39}$ each independently represent a hydrogen atom or an alkyl group having 1 to 20 carbon atoms), and $R^{31}$ to $R^{36}$ each independently represent a hydrogen atom, an alkyl group having 1 to 6 carbon atoms, or an aryl group having 6 to 10 carbon atoms, and $R^{37}$ represents an alkyl group having 1 to 6 carbon atoms or an aryl group having 6 to 10 carbon atoms.

$R^{27}$, $R^{28}$, $R^{29}$, $R^{24}$, $R^{26}$, and $R^{31}$ to $R^{37}$, and $R^{21}$ to $R^{23}$ and $R^{25}$ when the heterocycles are not formed, may be bonded to any other one of them to form a 5-membered ring or a 6-membered ring, and $R^{31}$ and $R^{36}$, and $R^{31}$ and $R^{37}$ may be bonded directly to each other. $R^{21}$ and $R^{22}$ when the heterocycles are not formed, each independently represent a hydrogen atom, an alkyl group or allyl group having 1 to 6 carbon atoms which may have a substituent, or an aryl group or alaryl group having 6 to 11 carbon atoms, and $R^{23}$ and $R^{25}$ when the heterocycles are not formed, each independently represent a hydrogen atom, a halogen atom, or an alkyl group or alkoxy group having 1 to 6 carbon atoms.

In the following, the heterocycle A will be sometimes referred to simply as a ring A. The same applies to the heterocycle B and the heterocycle C. In the compound (D2-1), the groups $R^{21}$ to $R^{26}$ of the benzene ring bonded to the left of the squarylium skeleton and those of the benzene ring that is bonded to the right of the squarylium skeleton may be different, but are preferably identical.

Note that the compound (D2-1) sometimes has the structure represented by the formula (D2-1'). The compound (D2-1') and the compound (D2-1) are structures resonant with each other, and in this specification, the compound (D2-1') is also handled as the compound (D2-1).

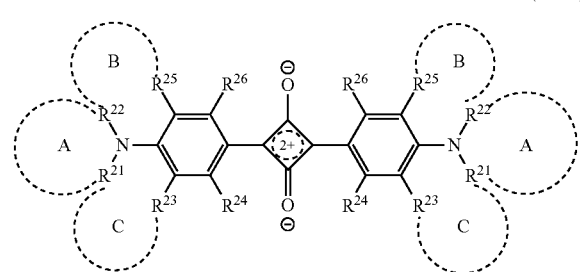

(D2-1')

The definition of the symbols in the formula (D2-1') is the same as that in the formula (D2-1).

In the compound (D2-1), $R^{24}$ and $R^{26}$ each independently represent the above atoms or groups. Examples of the halogen atom include a fluorine atom, a chlorine atom, a bromine atom, or the like. The alkyl group may be any of linear chain, branched chain, and cyclic. $R^{24}$ and $R^{26}$ are preferably of a combination in which one of them is a hydrogen atom and the other is —$NR^{27}R^{28}$.

When the compound (D2-1) has only the ring A, only the ring B and the ring C, or the ring A to the ring C out of the ring A to the ring C, —$NR^{27}R^{28}$ may be introduced into either of $R^{24}$ and $R^{26}$. Where the compound (D2-1) has only the ring B, or only the ring A and the ring B, —$NR^{27}R^{28}$ is preferably introduced into $R^{24}$. Similarly, when the chemical compound has only the ring C, or only the ring A and the ring C, —$NR^{27}R^{28}$ is preferably introduced into $R^{26}$.

As the —$NR^{27}R^{28}$, from the viewpoint of solubility to a host solvent or to the transparent resin (B), —NH—C(=O)—$R^{29}$ is preferred. $R^{29}$ is preferably an alkyl group having 1 to 20 carbon atoms which may have a substituent, an aryl group having 6 to 10 carbon atoms which may have a substituent, or an alaryl group having 7 to 18 carbon atoms which may have a substituent and may have an oxygen atom between carbon atoms. Examples of the substituent include a halogen atom such as a fluorine atom, a hydroxyl group, a carboxy group, a sulfo group, a cyano group, an alkyl group having 1 to 6 carbon atoms, a fluoroalkyl group having 1 to 6 carbon atoms, an alkoxy group having 1 to 6 carbon atoms, an acyloxy group having 1 to 6 carbon atoms, and the like.

Among them, $R^{29}$ is preferably a group selected from a linear, branched, or cyclic alkyl group having 1 to 17 carbon atoms which may be substituted by a fluorine atom, a phenyl group which may be substituted by a fluoroalkyl group having 1 to 6 carbon atoms, and/or an alkoxy group having 1 to 6 carbon atoms, and an alaryl group having 7 to 18 carbon atoms which may have an oxygen atom between carbon atoms and has, on its terminal, an alkyl group having 1 to 6 carbon atoms which may be substituted by a fluorine atom and/or a phenyl group which may be substituted by an alkoxy group having 1 to 6 carbon atoms.

As $R^{29}$, a group can be preferably used which is a hydrocarbon group having 5 to 25 carbon atoms and having at least one or more branches, in which one or more hydrogen atoms may be independently substituted by a halogen atom, a hydroxyl group, a carboxy group, a sulfo group, or a cyano group, and which may include an unsaturated bond, an oxygen atom, or a saturated or unsaturated ring structure between carbon atoms. Examples of such $R^{29}$ include groups represented by formulas (1a), (1b), (2a) to (2e), (3a) to (3e).

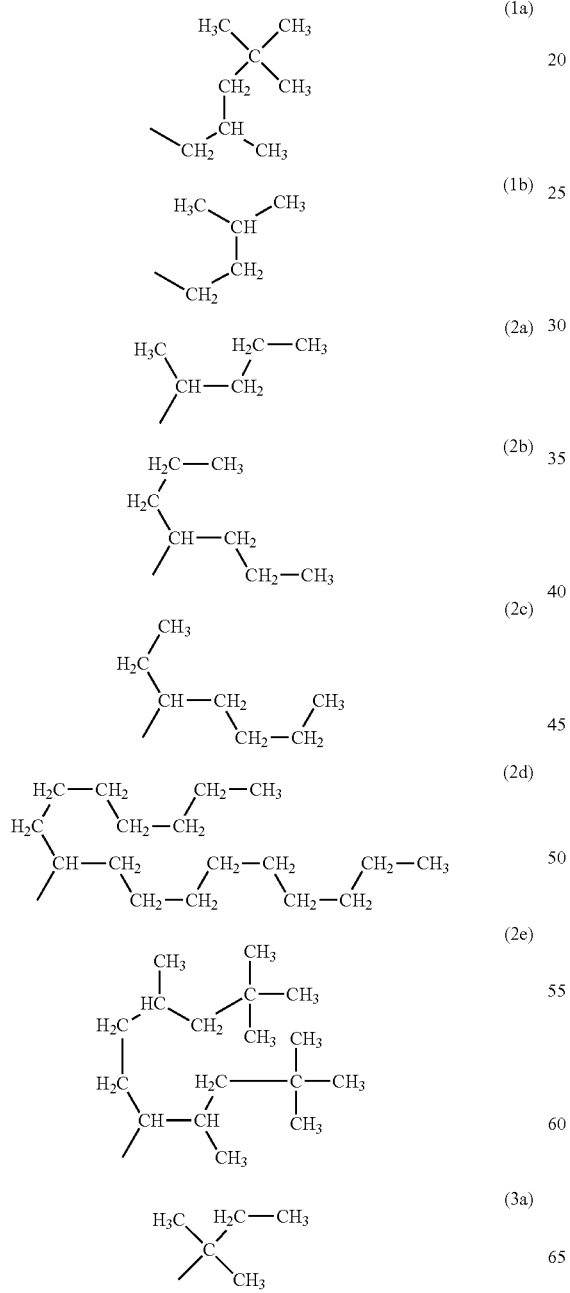

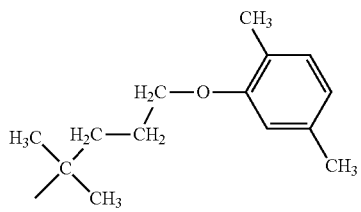

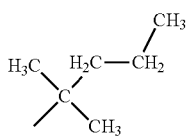

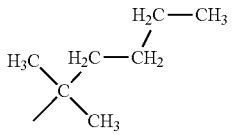

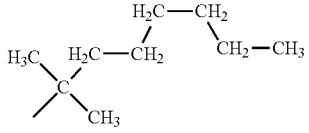

Further, —$NR^{27}R^{28}$ is preferably —NH—$SO_2$—$R^{30}$ in view of increasing a transmittance for visible light, in particular, a transmittance for 430 to 550 nm wavelength light. Preferably, $R^{30}$ is independently an alkyl group or alkoxy group having 1 to 12 carbon atoms which may have a branch structure or a hydrocarbon group having 6 to 16 carbon atoms that has an unsaturated ring structure, in view of light fastness. Examples of the unsaturated ring structure include benzene, toluene, xylene, furan, benzofuran, and so on. More preferably, $R^{30}$ is independently the alkyl group or alkoxy group having 1 to 12 carbon atoms which may have the branch structure. In each of the groups represented by $R^{30}$, hydrogen atoms may be partly or all substituted by halogen atoms, in particular, fluorine atoms. A degree of the substitution of the hydrogen atoms by the fluorine atoms is set within a range not causing a decrease of adhesion between the absorption layer containing the dye (D2-1) and the transparent substrate.

Specific examples of $R^{30}$ having the unsaturated ring structure include groups represented by the following formulas (P1) to (P8).

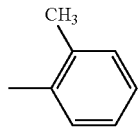

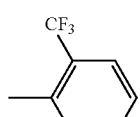

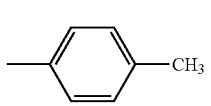

(P4)

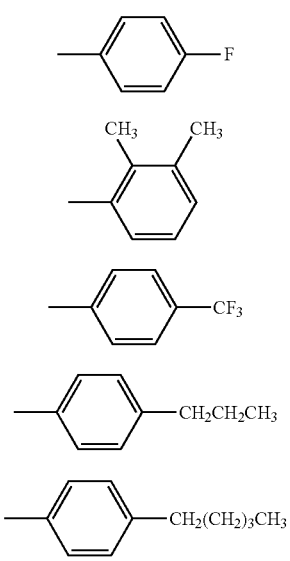

(P5)

(P6)

(P7)

(P8)

Similarly, in view of increasing a transmittance for visible light, in particular, a transmittance for 430 to 550 nm wavelength light, one of $R^{24}$ and $R^{26}$ in the dye (D2-1) is preferably a hydrogen atom and the other is preferably the group represented by the formula (S).

In the formula (S), $R^{41}$ and $R^{42}$ each independently represent a hydrogen atom, a halogen atom, or an alkyl group or alkoxy group having 1 to 10 carbon atoms. k is 2 or 3. $R^{41}$ and $R^{42}$ are each more preferably a hydrogen atom, a fluorine atom, or an alkyl group having 1 to 5 carbon atoms in view of preventing a large increase of its molecular weight, an addition amount, reactivity to squarylium, solubility in the resin, and so on.

More specific examples of the compound (D2-1) include a compound represented by the following formula (D2-11) that has only the ring B as the ring structure, a compound represented by the formula (D2-12) that has only the ring A as the ring structure, and a compound represented by the formula (D2-13) that has two ring structures, the ring B and the ring C. The compound represented by the formula (D2-11) is the same as the compound (D2-1) having only the ring C as the ring structure.

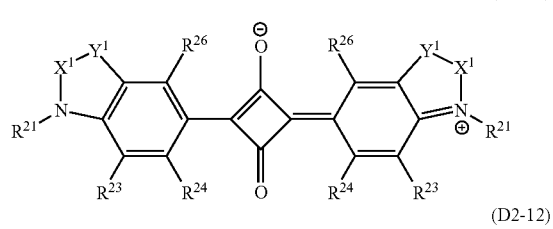

(D2-11)

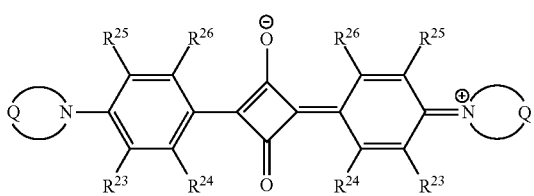

(D2-12)

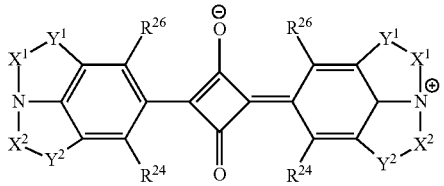

(D2-13)

The definition of the symbols in the formulas (D2-11) to (D2-13) is the same as that in the formula (D2-1), and their preferable forms are also the same.

In the compound (D2-11), $X^1$ is preferably the group (2x), and $Y^1$ is preferably a single bond or the group (1y). In this case, $R^{31}$ to $R^{36}$ are each preferably a hydrogen atom or an alkyl group having 1 to 3 carbon atoms, and a hydrogen atom or a methyl group is more preferable. Specific examples of —$Y^1$—$X^1$— include bivalent organic groups represented by the formulas (11-1) to (12-3).

—C(CH$_3$)$_2$—CH(CH$_3$)— (11-1)

—C(CH$_3$)$_2$—CH$_2$— (11-2)

—C(CH$_3$)$_2$—CH(C$_2$H$_5$)— (11-3)

—C(CH$_3$)$_2$—CH$_2$—CH$_2$— (12-1)

—C(CH$_3$)$_2$—CH$_2$—CH(CH$_3$)— (12-2)

—C(CH$_3$)$_2$—CH(CH$_3$)—CH$_2$— (12-3)

Among these, —$Y^1$—$X^1$— is preferably one of the groups (11-1) to (11-3), and is more preferably the group (11-1).

In the compound (D2-11), $R^{21}$ is independently more preferably a group represented by the formula (4-1) or (4-2) in view of solubility, heat resistance, and further steepness of a change near a boundary between the visible region and the near-infrared region in the spectral transmittance curve.

(4-1)

(4-2)

In the formula (4-1) and the formula (4-2), $R^{51}$, $R^{52}$, $R^{53}$, $R^{54}$, and $R^{55}$ each independently represent a hydrogen atom, a halogen atom, or an alkyl group having 1 to 4 carbon atoms.

In the compound (D2-11), $R^{24}$ is preferably —$NR^{27}R^{28}$ or the group (S), and a more preferable form is the same as in the above. In the compound (D2-11), $R^{23}$ and $R^{26}$ are each independently preferably a hydrogen atom, a halogen atom, or an alkyl group or alkoxy group having 1 to 6 carbon atoms, and the both are more preferably the hydrogen atoms.

Specific examples of (D2-11) include compounds (D2-11a-1) to (D2-11a-19) represented by the formula (D2-11a) and shown in Table 4, compounds (D2-11b-1) to (D2-11b-22) represented by the formula (D2-11b) and shown in Table 5, and a compound (D2-11c-1) represented by the formula (D2-11c) and shown in Table 6.

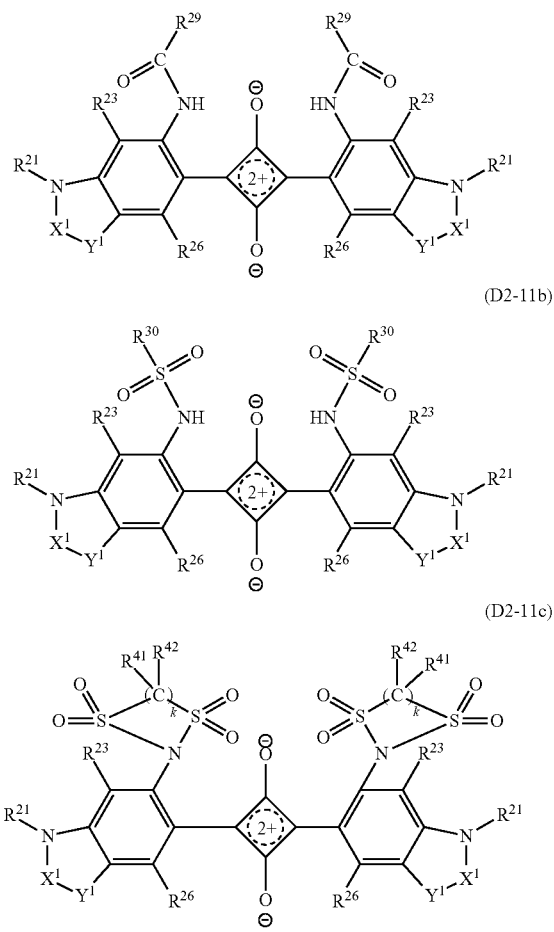

What the symbols in the formula (D2-11a) represent are shown in the following Table 4 for the respective compounds, what the symbols in the formula (D2-11b) represent are shown in the following Table 5 for the respective compounds, and what the symbols in the formula (D2-11c) represent are shown in the following Table 6. In Table 4 and Table 5, the group (11-1) is indicated by (11-1). The same applies to the other groups.

TABLE 4

| Dye abbreviation | Substituent | | | | |
|---|---|---|---|---|---|
| | $-Y^1-X^1-$ | $R^{21}$ | $R^{29}$ | $R^{23}$ | $R^{26}$ |
| D2-11a-1 | (11-1) | —CH$_3$ | (2b) | H | H |
| D2-11a-2 | (11-1) | —CH$_3$ | (2c) | H | H |
| D2-11a-3 | (11-1) | —CH$_3$ | (2d) | H | H |
| D2-11a-4 | (11-1) | —CH$_3$ | (2e) | H | H |
| D2-11a-5 | (11-1) | —CH$_2$CH$_3$ | (2c) | H | H |
| D2-11a-6 | (11-1) | —CH$_2$CH$_2$CH$_3$ | (2c) | H | H |
| D2-11a-7 | (11-1) | —CH(CH$_3$)$_2$ | (2c) | H | H |
| D2-11a-8 | (11-1) | —CH$_2$CH$_3$ | (3b) | H | H |
| D2-11a-9 | (11-1) | —CH$_3$ | (1b) | H | H |
| D2-11a-10 | (11-1) | —CH$_3$ | (2a) | H | H |
| D2-11a-11 | (11-1) | —CH$_3$ | (1a) | H | H |
| D2-11a-12 | (11-1) | —CH$_3$ | (3a) | H | H |
| D2-11a-13 | (11-1) | —CH$_3$ | (3b) | H | H |
| D2-11a-14 | (11-1) | —CH$_3$ | (3c) | H | H |
| D2-11a-15 | (11-1) | —C(CH$_3$)$_2$CH$_2$CH$_3$ | (2c) | H | H |
| D2-11a-16 | (11-1) | —C(CH$_3$)$_2$CH$_2$CH$_3$ | (3b) | H | H |
| D2-11a-17 | (11-1) | —C(CH$_3$)$_2$CH$_2$CH$_3$ | (3c) | H | H |
| D2-11a-18 | (11-1) | —C(CH$_3$)$_2$CH$_2$CH$_3$ | (3d) | H | H |
| D2-11a-19 | (11-1) | —C(CH$_3$)$_2$CH$_2$CH$_3$ | (3e) | H | H |

TABLE 5

| Dye abbreviation | Substituent | | | | |
|---|---|---|---|---|---|
| | $-Y^1-X^1-$ | $R^{21}$ | $R^{30}$ | $R^{23}$ | $R^{26}$ |
| D2-11b-1 | (11-1) | —CH$_3$ | —CH$_2$(CH$_2$)$_6$CH$_3$ | H | H |
| D2-11b-2 | (11-1) | —CH$_3$ | —CF$_3$ | H | H |
| D2-11b-3 | (11-1) | —CH$_3$ | —CF$_2$(CF$_2$)$_2$CF$_3$ | H | H |
| D2-11b-4 | (11-1) | —CH$_3$ | (P2) | H | H |
| D2-11b-5 | (11-1) | —CH$_3$ | (P5) | H | H |
| D2-11b-6 | (11-1) | —CH$_3$ | (P7) | H | H |
| D2-11b-7 | (11-1) | —CH$_3$ | (P8) | H | H |
| D2-11b-8 | (11-1) | —CH$_3$ | (P6) | H | H |
| D2-11b-9 | (11-1) | —CH(CH$_3$)$_2$ | —CF$_3$ | H | H |
| D2-11b-10 | (11-1) | —CH(CH$_3$)$_2$ | —CH(CH$_3$)$_2$ | H | H |
| D2-11b-11 | (11-1) | —CH(CH$_3$)$_2$ | (P4) | H | H |
| D2-11b-12 | (11-1) | —CH(CH$_3$)$_2$ | (P3) | H | H |
| D2-11b-13 | (11-1) | —CH(CH$_3$)$_2$ | —CH$_2$CH$_2$CH$_3$ | H | H |
| D2-11b-14 | (11-1) | —CH(CH$_3$)$_2$ | (P7) | H | H |
| D2-11b-15 | (11-1) | —CH(CH$_3$)$_2$ | —CH$_2$(CH$_2$)$_6$CH$_3$ | H | H |
| D2-11b-16 | (11-1) | —CH(CH$_3$)$_2$ | (P6) | H | H |
| D2-11b-17 | (11-1) | —CH(CH$_3$)$_2$ | —CF$_2$(CF$_2$)$_2$CF$_3$ | H | H |
| D2-11b-18 | (11-1) | —CH(CH$_3$)$_2$ | (P1) | H | H |
| D2-11b-19 | (11-1) | —CH(CH$_3$)$_2$ | (P8) | H | H |
| D2-11b-20 | (11-1) | —C(CH$_3$)$_2$CH$_2$CH$_3$ | —CH$_2$(CH$_2$)$_6$CH$_3$ | H | H |
| D2-11b-21 | (11-1) | —C(CH$_3$)$_2$CH$_2$CH$_3$ | —CF$_3$ | H | H |
| D2-11b-22 | (11-1) | —C(CH$_3$)$_2$CH$_2$CH$_3$ | —CF$_2$(CF$_2$)$_2$CF$_3$ | H | H |

TABLE 6

| Dye abbre- | Substituent/k | | | | | | |
|---|---|---|---|---|---|---|---|
| viation | —Y¹—X¹— | $R^{21}$ | $R^{23}$ | $R^{26}$ | k | $R^{41}$ | $R^{42}$ |
| D2-11c-1 | (11-1) | —CH(CH$_3$)$_2$ | H | H | 2 | F | F |

In the compound (D2-12), Q is an alkylene group having 4 or 5 carbon atoms or an alkyleneoxy group having 3 or 4 carbon atoms whose hydrogen atom may be substituted by an alkyl group having 1 to 6 carbon atoms, an aryl group having 6 to 10 carbon atoms, or an acyloxy group having 1 to 10 carbon atoms which may have a substituent. Oxygen when Q is the alkyleneoxy group is preferably at a position except a position next to N. Q is preferably a butylene group which may be substituted by an alkyl group having 1 to 3 carbon atoms, in particular, by a methyl group.

In the compound (D2-12), $R^{24}$ and $R^{26}$ are preferably a combination in which one of these is a hydrogen atom and the other is —NR$^{27}$R$^{28}$. —NR$^{27}$R$^{28}$ is preferably —NH—C(=O)—(CH$_2$)$_m$—CH$_3$ (m is 0 to 19), —NH—C(=O)-Ph-R$^{50}$ (-Ph- represents a phenylene group, and R$^{50}$ represents a hydrogen atom, an alkyl group having 1 to 3 carbon atoms whose hydrogen atom may be substituted by a fluorine atom, or an alkoxy group having 1 to 3 carbon atoms), or the like.

Here, since $\lambda_{max}$ of the compound (D2-12) is on a relatively longer wavelength side in the aforesaid wavelength region, using the compound (D2-12) enables to widen a transmission region of the visible region. Example of the compound (D2-12) include compounds represented by the formulas (D2-12-1) to (D2-12-3).

In the compound (D2-13), $X^1$ and $X^2$ are each independently preferably an ethylene group whose hydrogen atom may be substituted by an alkyl group having 1 to 6 carbon atoms or by an aryl group having 6 to 10 carbon atoms, represented by the aforesaid (2x). In this case, the substituent is preferably an alkyl group having 1 to 3 carbon atoms, and is more preferably a methyl group. Specific examples of $X^1$ and $X^2$ include —(CH$_2$)$_2$—, —CH$_2$—C(CH$_3$)$_2$—, —CH(CH$_3$)—C(CH$_3$)$_2$—, and —C(CH$_3$)$_2$—C(CH$_3$)$_2$. $Y^1$ and $Y^2$ are each independently —CH$_2$—, —C(CH$_3$)$_2$—, —CH(C$_6$H$_5$)—, —CH((CH$_2$)$_m$CH$_3$)— (m is 0 to 5) or the like.

In the compound (D2-13), $R^{24}$ and $R^{26}$ are preferably a combination in which one of these is a hydrogen atom and the other is —NR$^{27}$R$^{28}$. —NR$^{27}$R$^{28}$ is preferably —NH—C(=O)—C$_m$H$_{2m+1}$ (m is 1 to 20, and C$_m$H$_{2m+1}$ may be linear chain, branched chain, or cyclic), —NH—C(=O)-Ph-R$^{50}$ (-Ph- represents a phenylene group, and R$^{50}$ represents a hydrogen atom, an alkyl group having 1 to 3 carbon atoms, an alkoxy group having 1 to 3 carbon atoms, or a perfluoroalkyl group having 1 to 3 carbon atoms), or the like. Examples of the compound (D2-13) include compounds represented by the formula (D2-13-1) or (D2-13-2).

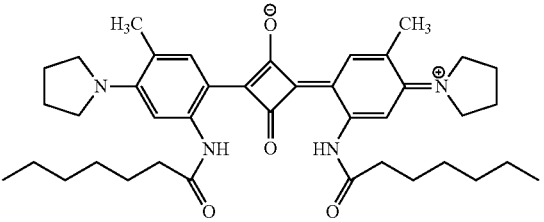

(D2-12-3)

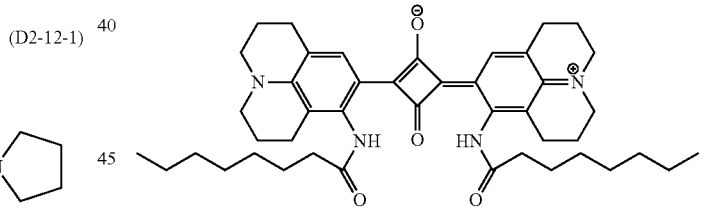

(D2-13-1)

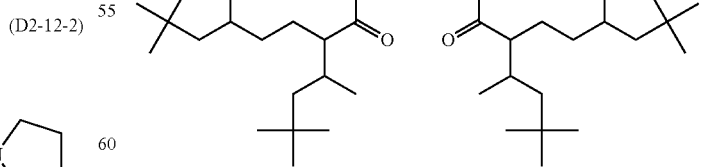

(D2-13-2)

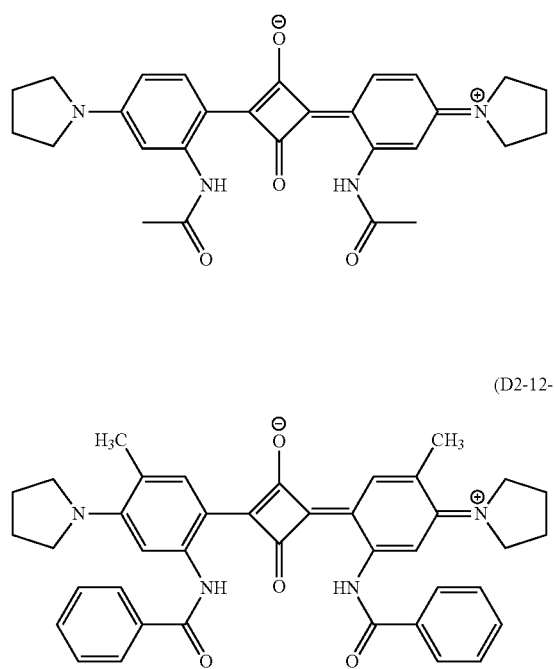

(D2-12-1)

(D2-12-2)

As the dye (D2), a squarylium-based compound represented by the following formula (F6) is also usable. The formula (F6) represents the compound represented by the formula (D2-1) in which none of the ring A, the ring B, and the ring C is formed ($R^{21}$ to $R^{26}$ represent as follows).

(F6)

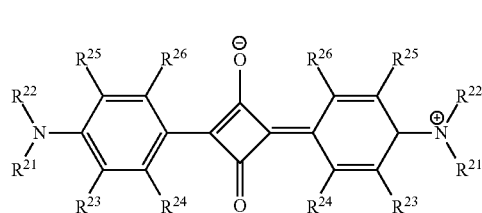

The symbols in the formula (F6) represent as follows. $R^{21}$ and $R^{22}$ each independently represent a hydrogen atom, an alkyl group or allyl group having 1 to 12 carbon atoms which may have a substituent, or an aryl group or alaryl group having 6 to 11 carbon atoms. $R^{23}$ and $R^{25}$ each independently represent a hydrogen atom, a halogen atom, or an alkyl group or alkoxy group having 1 to 6 carbon atoms. $R^{24}$ and $R^{26}$ each independently represent a hydrogen atom, a halogen atom, a hydroxyl group, an alkyl group or alkoxy group having 1 to 6 carbon atoms, an acyloxy group having 1 to 10 carbon atoms, or —$NR^{27}R^{28}$ ($R^{27}$ and $R^{28}$ are each independently a hydrogen atom, an alkyl group having 1 to 20 carbon atoms, or —C(=O)—$R^{29}$ ($R^{29}$ is a hydrogen atom, an alkyl group having 1 to 20 carbon atoms or aryl group having 6 to 11 carbon atoms which may have a substituent, or an alaryl group having 7 to 18 carbon atoms which may have a substituent and which may have an oxygen atom between the carbon atoms)). Examples of the compound (F6) include compounds represented by the formula (F6-1) or (F6-2).

(F6-1)

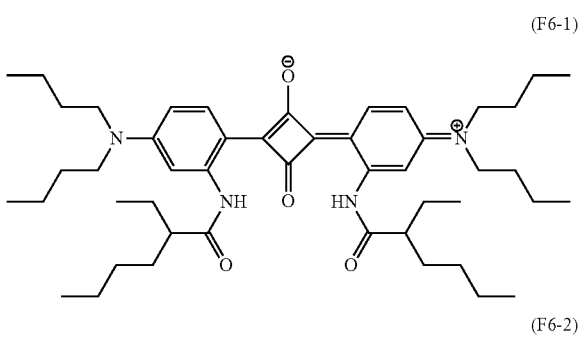

(F6-2)

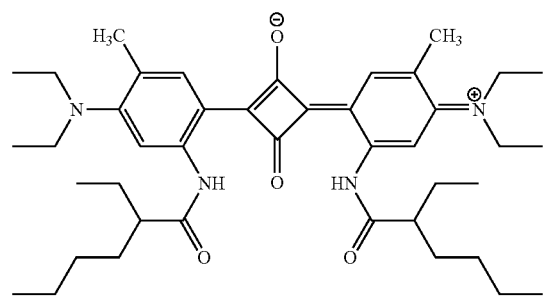

As the dye (D2), a squarylium-based compound represented by the following formula (F7) is also usable.

(F7)

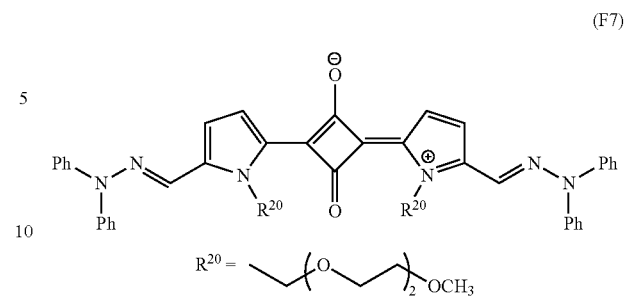

The compounds (D2-1) such as the compounds (D2-11) to (D2-13), the compound (F6), and the compound (F7) can be manufactured by conventionally known methods. The compound (D2-11a) can be manufactured by, for example, the method described in the specification of U.S. Pat. No. 5,543,086. The compounds (D2-11b), (D2-11c) can be manufactured by, for example, the methods described in the specification of U.S. Patent Application Publication No. 2014/0061505 and the specification of International Publication WO2014/088063. The compound (D2-12) can be manufactured by, for example, the method described in J. Org. Chem. 2005, 70(13), 5164-5173.

In this embodiment, as the dye (A), one kind of the dye (D1) may be used alone or two kinds or more of the dyes (D1) may be used in combination. The dye (A) preferably contains one kind of the dye (D2) or two kinds or more thereof in combination with the dye (D1). Further, the dye (A) may contain a NIR dye other than the dye (D1) and the dye (D2), and the use of only the dye (D1) and the dye (D2) is preferable.

The content of the dye (D1) in the absorption layer is not limited, as long as the absorption layer using the dye (A) containing the dye (D1) functions with the reflection layer so that the present filter satisfies the aforesaid requirements (i-1) to (i-3). Specifically, this content is preferably 0.01 to 30 parts by mass to 100 parts by mass of the transparent resin (B). When this content is 0.01 parts by mass or more, it is possible to obtain the desired near-infrared absorbing capability, and when it is 30 parts by mass or less, deterioration of the near-infrared absorbing capability, an increase of a haze value, and the like are reduced. The content of the dye (D1) is more preferably 0.5 to 25 parts by mass, and still more preferably 1 to 20 parts by mass.

The content of the dye (D2) in the absorption layer is not limited, as long as the absorption layer using the dye (A) containing the dye (D1) and the dye (D2) functions with the reflection layer so that the present filter satisfies the aforesaid requirements (i-1) to (i-3). Specifically, the content of the dye (D2) is preferably 0.01 to 30 parts by mass to 100 parts by mass of the transparent resin (B). However, the total content of the dye (D2) and the dye (D1) is preferably 30 parts by mass or less to 100 parts by mass of the transparent resin (B). When the content of the dye (D2) is 0.01 parts by mass or more, it is possible to obtain the desired near-infrared absorbing capability when it is combined with the dye (D1). When the total content of the dye (D2) and the dye (D1) is 30 parts by mass or less, the deterioration of the near-infrared absorbing capability, the increase of the haze value, and so on are reduced. The content of the dye (D2) is more preferably 0.5 to 25 parts by mass, and still more preferably 1 to 20 parts by mass.

The content of the dye (A) in the absorption layer is preferably 30 parts by mass or less, more preferably 25 parts by mass or less, and still more preferably 20 parts by mass or less to 100 parts by mass of the transparent resin (B), from the viewpoint of reducing the deterioration of the near-infrared absorbing capability, the increase of the haze value, and so on, similarly to the above.

(Ultraviolet Absorbing Dye (U))

The ultraviolet absorbing dye (U) preferably satisfies the following requirement (v-1). (v-1) in a 350 to 800 nm wavelength absorption spectrum measured when the ultraviolet absorbing dye (U) is dissolved in dichloromethane (hereinafter, referred to as an "absorption spectrum of the dye (U)"), the largest absorption wavelength is in a 360 to 415 nm wavelength region.

Using the dye (U) satisfying the requirement (v-1) makes it possible to obtain good ultraviolet blocking characteristics without lowering a transmittance for 430 nm or more since its largest absorption wavelength is appropriate and its absorption spectrum has a steep rise. In the absorption spectrum of the dye (U), the largest absorption wavelength of the dye (U) is more preferably in a 370 to 415 nm wavelength region, and still more preferably in a 390 to 410 nm wavelength region.

Specific examples of the dye satisfying the requirement (v-1) (hereinafter, referred to as a dye (U1)) include an oxazole-based, a merocyanine-based, a cyanine-based, a naphthalimide-based, an oxadiazole-based, an oxazin-based, an oxazolidine-based, a naphthalic acid-based, a styryl-based, an anthracene-based, a cyclic carbonyl-based, a triazole-based dye, and the like, and the merocyanine-based dye is preferable.

In this embodiment, as the dye (U1), one kind selected from a plurality of compounds having the aforesaid absorption characteristics as the dye (U1) may be used alone, or two kinds or more of these may be used in combination. The dye (U) preferably contains one kind of the dye (U1) or two kinds or more of the dyes (U1). The dye (U) may contain another ultraviolet absorbing dye other than the dye (U1). In this case, however, it is preferably contained within a range not impairing the effect by the dye (U1).

The content of the dye (U) in the absorption layer is decided so as to cause the present filter to satisfy the requirement (i-5). The content of the dye (U) in the absorption layer is preferably 0.01 to 30 parts by mass, more preferably 0.05 to 25 parts by mass, and still more preferably 0.1 to 20 parts by mass to 100 parts by mass of the transparent resin.

(Transparent Resin (B))

Specific examples of the transparent resin (B) include an acrylic resin, an epoxy resin, an ene-thiol resin, a polycarbonate resin, a polyether resin, a polyarylate resin, a polysulfone resin, a polyethersulfone resin, a polyparaphenylene resin, a polyarylene ether phosphine oxide resin, a polyimide resin, a polyamide-imide resin, a polyolefin resin, a cyclic olefin resin, and a polyester resin. As the transparent resin (B), one kind out of these resins may be used alone or a mixture of two kinds or more of them may be used.

Among the above, the transparent resin is preferably a resin having a high glass transition temperature (Tg) in view of transparency, solubility of the dye (A) and the dye (U) in the transparent resin (B), and heat resistance. Specifically, Tg of the transparent resin (B) is preferably 140° C. or more, and more preferably 200° C. or more.

As the resin having high Tg, one kind or more selected from a polyester resin, a polycarbonate resin, a polyethersulfone resin, a polyarylate resin, a polyimide resin, and an epoxy resin are preferable. The transparent resin is more preferably one kind or more selected from the polyester resin and the polyimide resin, and the polyimide resin is especially preferable. As the polyester resin, a polyethylene terephthalate resin, a polyethylene naphthalate resin, or the like is preferable.

As the transparent resin (B), a commercially available product may be used. Examples of the commercially available product include, as the acrylic resin, OGSOL (registered trademark) EA-F5003 (manufactured by Osaka Gas Chemicals Co., Ltd., brand name), polymethyl methacrylate and polyisobutyl methacrylate (the both are manufactured by Tokyo Chemical Industry Co., Ltd., brand name), BR50 (manufactured by Mitsubishi Rayon Co., Ltd, brand name), and so on.

Further, examples as the polyester resin include OKP4HT, OKP4, B-OKP2, OKP-850 (all manufactured by Osaka Gas Chemicals Co., Ltd. brand names), VYLON (registered trademark) 103 (manufactured by Toyobo Co., Ltd, brand name), and so on.

Examples as the polycarbonate resin include LeXan (registered trademark) ML9103 (manufactured by sabic, brand name), EP5000 (manufactured by Mitsubishi Gas Chemical Company, Inc., brand name), SP3810, SP1516, TS2020 (all of them are brand names and manufactured by Teijin Chemicals Ltd.), xylex (registered trademark) 7507 (manufactured by sabic, brand name), and so on. Examples as the cyclic olefin resin include ARTON (registered trademark) (manufactured by JSR Corporation, brand name), ZEONEX (registered trademark) (manufactured by Zeon Corporation, brand name), and so on.

Examples as the polyimide resin include Neopulim (registered trademark) C3650, C3G30, C3450 (all of them are brand names and manufactured by Mitsubishi Gas Chemical Company, Inc.), JL-20 (manufactured by New Japan Chemical Co., Ltd., brand name) (these polyimide resins each may contain silica), and so on.

(Other Components)

In addition to the aforesaid dye (A) and dye (U), the absorption layer may further contain various kinds of optional components that an absorption layer of this type typically contains, within a range not impairing the effect of the present invention. Examples of the optional components include a color tone correcting dye, a leveling agent, an antistatic agent, a heat stabilizer, a light stabilizer, an antioxidant, a dispersing agent, a fire retardant, a lubricant, a plasticizer, a singlet oxygen quencher, and the like.

(Method of Manufacturing Absorption Layer)

It is possible to form the absorption layer by, for example, preparing a coating liquid by dissolving or dispersing the dye (A) and the transparent resin (B) or a raw material component of the transparent resin (B), or by dissolving or dispersing the dye (A), the dye (U), and the transparent resin (B) or the raw material component of the transparent resin (B), in a solvent, and applying the coating liquid on a substrate, followed by drying and further curing as necessary. The substrate may be the transparent substrate usable as the constituent member of the present filter, or may be, for example, a releasable substrate used only when the absorption layer is formed. Even in the case where the present filter includes the transparent substrate as the constituent member, a releasable support substrate is usable, and a glass plate, a release-treated plastic film, a stainless steel plate, or the like is usable.

The solvent is not limited, and examples thereof include alcohols, glycols, ketones, amides, sulfoxides, ethers, esters, chloroform, aliphatic halogenated hydrocarbons, aliphatic hydrocarbons, a fluorine-based solvent, and so on. One kind out of these solvents is usable alone, or a mixture of two kinds or more of these is usable. Note that, in this specification, the term "solvent" is used as a concept including both a dispersion medium and a solvent.

By preparing the coating liquid contain a surfactant, it is possible to improve the appearance, in particular, correct a void due to minute bubbles, a dent due to the adhesion of foreign matter, and the like, and crawling in the drying step. The surfactant is not limited, and a well-known cationic, anionic, or nonionic surfactant is optionally usable.

For applying the coating liquid, usable is, for example, a coating method such as an immersion coating method, a cast coating method, a spray coating method, a spinner coating method, a bead coating method, a wire bar coating method, a blade coating method, a roller coating method, a curtain coating method, a slit die coater method, a gravure coater method, a slit reverse coater method, a micro gravure method, an ink-jet method, or a comma coater method. Besides, a bar coater method, a screen printing method, a flexographic printing method, or the like is also usable.

Further, the absorption layer can also be manufactured in a film form by extrusion molding, and further a plurality of films may be stacked and integrated by thermocompression bonding. Where the present filter includes the transparent substrate as the constituent member, the absorption layer may be pasted on the transparent substrate.

[Reflection Layer]

The reflection layer has wavelength selection characteristics of transmitting visible light and blocking, by reflection, light including at least near-infrared light in a region except the light blocking region of the absorption layer. The present filter has high light blocking characteristics for the near infrared region owing to the complementary functions of the absorption layer and the reflection layer.

The reflection layer in the present filter has characteristics that its minimum reflectance for 730 to 900 nm wavelength light is lower when an incident angle is 60° than when the incident angle is 0° (hereinafter, referred to as "incident angle dependence (1)"). Such characteristics of the reflection layer noticeably appear in, for example, a reflection layer formed of the following dielectric multilayer film in a case where the total number of the stacked films is small or in a case where the film thickness is small. The present filter is designed with the intention to make warpage due to stress small on one hand especially by reducing the total number of the stacked films and reducing the film thickness in the reflection layer typically in a NIR filter requiring weight reduction and downsizing, and on the other hand, to compensate the incident angle dependence (1) likely to appear in the reflection layer by the near-infrared wavelength light blocking characteristics that the absorption layer has.

As for the incidence angle dependence (1) in the reflection layer, when a value equal to the minimum reflectance for 730 to 900 nm wavelength light at a 0° incident angle from which the minimum reflectance for the light at the 60° incident angle is subtracted is, for example, 3% or more, in particular, within a 3 to 50% range, this is easily compatible with the downsizing and the optical characteristics satisfying the requirements (i-1) to (i-3) in the present filter where the reflection layer is combined with the aforesaid absorption layer.

The reflection layer is typically formed of a dielectric multilayer film in which a low-refractive index dielectric film (low-refractive index film) and a high-refractive index dielectric film (high-refractive index film) are alternately stacked. The refractive index of the high-refractive index film is preferably 1.6 or more, and more preferably 2.2 to 2.5. Examples of a material of the high-refractive index film include $Ta_2O_5$, $TiO_2$, and $Nb_2O_5$. Among these, $TiO_2$ is preferable in view of reproducibility in film formability, the refractive index, and the like, stability, and so on.

The refractive index of the low-refractive index film is preferably less than 1.6, and more preferably not less than 1.45 and less than 1.55. Examples of a material of the low-refractive index film include $SiO_2$, $SiO_xN_y$, and so on. $SiO_2$ is preferable in view of reproducibility in film formability, stability, economic efficiency, and so on.

In this embodiment, the dielectric multilayer film forming the reflection layer preferably satisfies the following requirements (vi-1) and (vi-2):

(vi-1) in spectral transmittance curves for a 0° incident angle and a 30° incident angle, a transmittance for 420 to 600 nm wavelength light is 85% or more; and (vi-2) in the spectral transmittance curves for the 0° incident angle and the 30° incident angle, a transmittance for a $\lambda_b$ nm to 1100 nm wavelength region is 1% or less (where $\lambda_b$ is the longest wavelength for which a transmittance of the absorption layer for 650 to 800 nm wavelength light becomes 1%).

In the above (vi-1), the transmittance is more preferably 87% or more, and still more preferably 90% or more. In the above (vi-2), the transmittance is more preferably 0.5% or less. When the reflection layer satisfies the above requirements (vi-1) and (vi-2), the present filter can easily have the spectral transmittance characteristics satisfying the requirements (i-1) to (i-7).

Further, a transmittance of the reflection layer for a boundary wavelength region between its transmission region and its light blocking region preferably sharply varies. For this purpose, the total number of the stacked films of the dielectric multilayer film forming the reflection layer is preferably 15 or more, more preferably 25 or more, and still more preferably 30 or more. However, too large a total number of the stacked films leads to warpage or the like and an increase of the film thickness, and thus the total number of the stacked films is preferably 100 or less, more preferably 75 or less, and still more preferably 60 or less. The film thickness of the dielectric multilayer film is preferably 2 to 10 μm.

When the total number of the stacked films and the film thickness of the dielectric multilayer film fall within the aforesaid ranges, the reflection layer can satisfy the requirement for the downsizing, and it is possible to make the degree of the incident angle dependence (1) within the aforesaid range while maintaining high productivity. For the formation of the dielectric multilayer film, a vacuum film-forming process such as a CVD method, a sputtering method, or a vacuum deposition method, a wet film-forming process such as a spray method or a dip method, or the like is usable, for instance.

The reflection layer may impart predetermined optical characteristics with a single layer (single dielectric multilayer film), or may impart the predetermined optical characteristics with a plurality of layers. Where the plural layers are provided, they may be provided, for example, on one main surface side of the transparent substrate, or may be provided on its both main surface sides, with the transparent substrate therebetween.

Note that, in this specification, that the transmittance is, for example, 90% or more for a specific wavelength region means that the transmittance is not below 90% for the whole of this wavelength region. Similarly, that the transmittance is, for example, 1% or less means that the transmittance is not over 1% for the whole of this wavelength region.

33

[Antireflection Layer]

Examples of the antireflection layer include a dielectric multilayer film, an intermediate-refractive index medium, and a moth-eye structure whose refractive index gradually varies. Among them, the dielectric multilayer film is preferable in view of optical efficiency and productivity. The antireflection layer is formed of alternately stacked dielectric films, similarly to the reflection layer.

The present filter may include, as other constituent elements, a constituent element (layer) for absorption formed of inorganic fine particles, and the like that control the transmission and the absorption of light in a specific wavelength region, for instance. Specific examples of the inorganic fine particles include ITO (Indium Tin Oxides), ATO (Antimony-doped Tin Oxides), cesium tungstate, lanthanum boride, and so on. ITO fine particles and cesium tungstate fine particles have a high visible light transmittance and also have light absorption characteristics for a wide range of the infrared wavelength region over 1200 nm, and thus can be used when blocking characteristics for the infrared light in this region are required.

The present filter is usable in an imaging device such as a digital still camera. Further, when used, the present filter can be disposed between an imaging lens and a solid state image sensing device or can be directly pasted on the solid state image sensing device, the imaging lens, or the like of the imaging device via an adhesive layer.

EXAMPLES

Next, the present invention will be more specifically described by examples. Examples 1 to 6 are the examples, and Examples 7 and 8 are comparative examples.

<Synthesis or Preparation of Dyes>

As dyes (D1) used in the examples, dyes (D1-11-1) to (D1-11-3), a dye (D1-11-6), a dye (D1-12-1), a dye (D1-12-2), and a dye (D1-22-4) were synthesized by the following methods, and a dye (CroPy1) was synthesized by a usual method. These dyes are the dyes described in Table 1 and Table 2. Further, SD-AG01 (brand name, manufactured by Sumitomo Seika Chemicals Co., Ltd) was prepared. These dyes all are the dyes (D1) exhibiting the optical characteristics in Table 3.

Further, as a dye (D2), a dye (D2-11a-7) and a dye (D2-11b-1) were synthesized. Further, as a UV dye, a merocyanine-based dye represented by the formula (M-2) was synthesized by a usual method to be prepared. For the evaluation of optical characteristics of these dyes, an ultraviolet and visible light spectrophotometer (manufactured by Hitachi High-Technologies Corporation, U-4100 type) was used, and for the evaluation of the optical characteristics below (spectral transmittance curve), U-4100 was also used.

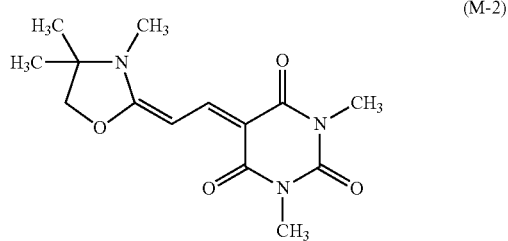

(1) Manufacture of Dyes (D1)

(1-1) Manufacture of Dye (D1-12-1)

The dye (D1-12-1) was synthesized according to the following reaction path.

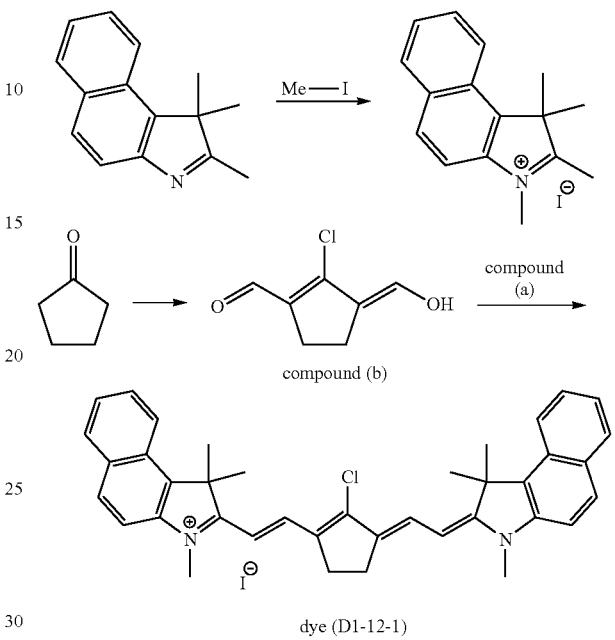

(Synthesis of Compound (a))

Into an eggplant flask, 50 g (0.14 mol) of 1,1,2-trimethyl-1H-benz[e]indole, 200 cc of tetrahydrofuran (THF), and 84.7 g (0.36 mol) of methyl iodide were fed, followed by sixteen-hour reflux stirring at 60° C. Thereafter, a precipitated solid was filtered out and the solid was washed with THF, and as a result, a 76 g (91% yield, 0.21 mol) of compound (a) was obtained.

(Synthesis of Compound (b))

Into an eggplant flask, 86.9 g (1.19 mol) of dimethylformamide was fed, and 41.9 g (0.27 mol) of phosphorus oxychloride was added little by little under ice cooling, followed by one-hour stirring at 65° C. After the stirring, 10 g (0.12 mol) of cyclopentanone was added little by little, followed by one-hour stirring at 65° C. after the addition was finished. After the reaction, the reaction crude solution was added little by little to a beaker containing 800 cc of water, followed by one-night stirring. A precipitated solid was filtered out and the obtained solid was washed with water. As a result, a 6.4 g (34% yield, 0.04 mol) of compound (b) was obtained.

(Synthesis of Dye (D1-12-1))

Into an eggplant flask, 3.0 g (0.019 mol) of the compound (b), 13.3 g (0.038 mol) of the compound (a), 65 cc of ethanol, 7.7 g (0.076 mol) of triethylamine, and 7.7 g (0.076 mol) of acetic anhydride were fed, followed by one-hour stirring at 50° C. Thereafter, a solvent was distilled off by an evaporator, followed by refining by a silica gel column chromatography method, and as a result, 2.6 g (20% yield, 0.0038 mol) of the dye (D1-12-1) was obtained.

(1-2) Manufacture of Dye (D1-12-2)

The dye (D1-12-2) was synthesized according to the following reaction path.

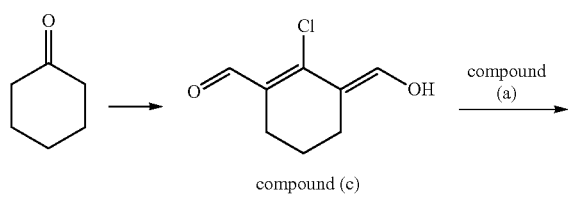

compound (c)

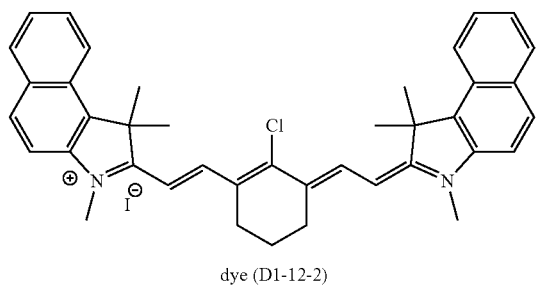

dye (D1-12-2)

(Synthesis of Compound (c))

Into an eggplant flask, 74.5 g (1.01 mol) of dimethylformamide was fed, and 35.9 g (0.23 mol) of phosphorus oxychloride was added little by little under ice cooling, followed by one-hour stirring at 65° C. After the stirring, 10 g (0.10 mol) of cyclohexanone was added little by little, followed by one-hour stirring at 65° C. after the addition was finished. After the reaction, the reaction crude solution was added little by little to a beaker containing 800 cc of water, followed by one-night stirring. A precipitated solid was filtered out and the obtained solid was washed with water. As a result, a 9.7 g (55% yield, 0.06 mol) of compound (c) was obtained.

(Synthesis of Dye (D1-12-2))

Into an eggplant flask, 3.0 g (0.017 mol) of the compound (c), 12.2 g (0.035 mol) of the compound (a), 58 cc of ethanol, 7.0 g (0.070 mol) of triethylamine, and 7.1 g (0.071 mol) of acetic anhydride were fed, followed by one-hour stirring at 50° C. Thereafter, a solvent was distilled off by an evaporator, followed by refining by a silica gel column chromatography method, and as a result, 2.1 g (17% yield, 0.0030 mol) of the dye (D1-12-2) was obtained.

(1-3) Manufacture of Dye (D1-11-1)

The dye (D1-11-1) was synthesized according to the following reaction path.

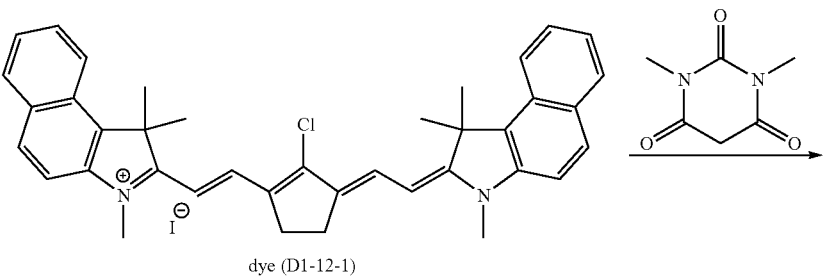

dye (D1-12-1)

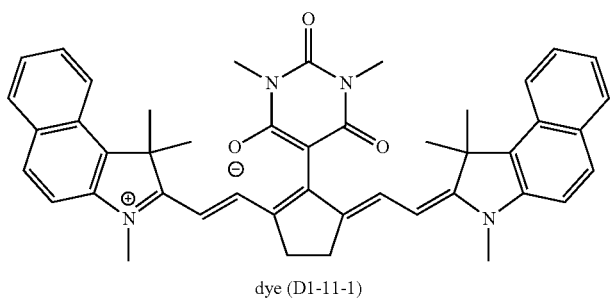

dye (D1-11-1)

(Synthesis of Dye (D1-11-1))

Into an eggplant flask, 2.5 g (0.0036 mol) of the dye (D1-12-1), 0.95 g (0.0061 mol) of 1,3-dimethylbarbituric acid, 0.45 g (0.0045 mol) of triethylamine, 40 cc of dichloromethane, and 40 cc of methanol were fed, followed by one-hour reflux stirring at 65° C. Thereafter, a solvent was distilled off, followed by refining by a silica gel column chromatography method, and as a result, 1.5 g (59% yield, 0.0022 mol) of the dye (D1-11-1) was obtained.

(1-4) Manufacture of Dye (D1-11-2)

The dye (D1-11-2) was synthesized according to the following reaction path.

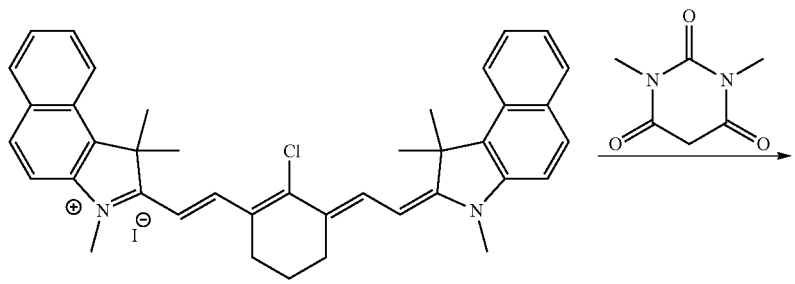

dye (D1-12-2)

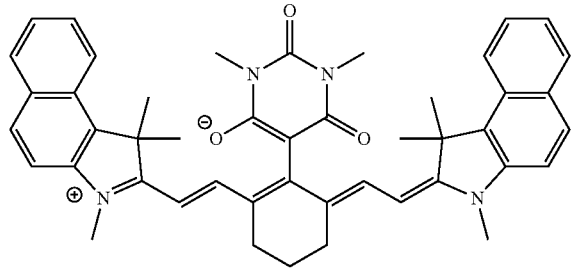

dye (D1-11-2)

(Synthesis of Dye (D1-11-2))

Into an eggplant flask, 2.0 g (0.0028 mol) of the dye (D1-12-2), 0.75 g (0.0048 mol) of 1,3-dimethylbarbituric acid, 0.36 g (0.0035 mol) of triethylamine, 30 cc of dichloromethane, and 30 cc of methanol were fed, followed by one-hour reflux stirring at 65° C. Thereafter, a solvent was distilled off, followed by refining by a silica gel column chromatography method, and as a result, 1.0 g (52% yield, 0.0015 mol) of the dye (D1-11-2) was obtained.

(1-5) Manufacture of Dye (D1-11-3)

The dye (D1-11-3) was synthesized according to the following reaction path.

(Synthesis of Dye (D1-11-3))

Into an eggplant flask, 2.0 g (0.0028 mol) of the dye (D1-12-2), 1.01 g (0.0048 mol) of 1,3-dipropyl barbituric acid, 0.36 g (0.0035 mol) of triethylamine, 30 cc of dichloromethane, and 30 cc of methanol were fed, followed by one-hour reflux stirring at 65° C. Thereafter, a solvent was distilled off, followed by refining by a silica gel column chromatography method, and as a result, 1.5 g (70% yield, 0.0020 mol) of the dye (D1-11-3) was obtained.

(1-6) Manufacture of Dye (D1-11-6)

The dye (D1-11-6) was synthesized according to the following reaction path.

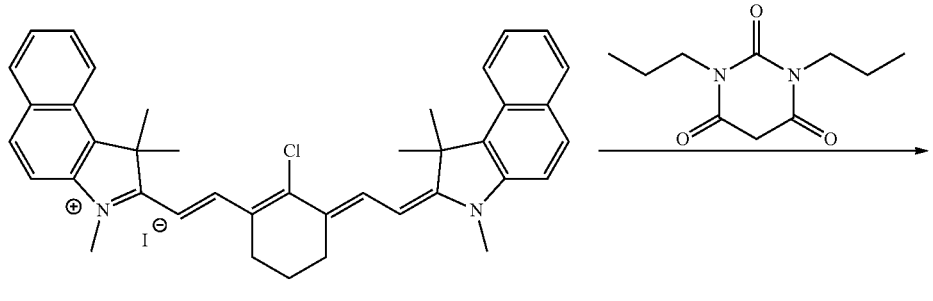

dye (D1-12-2)

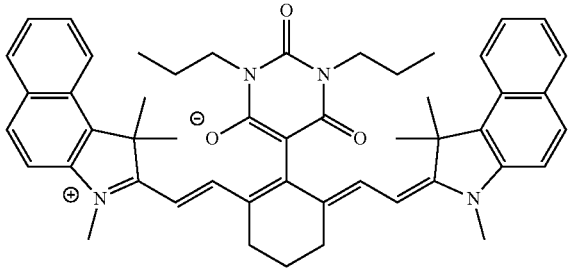

dye (D1-11-3)

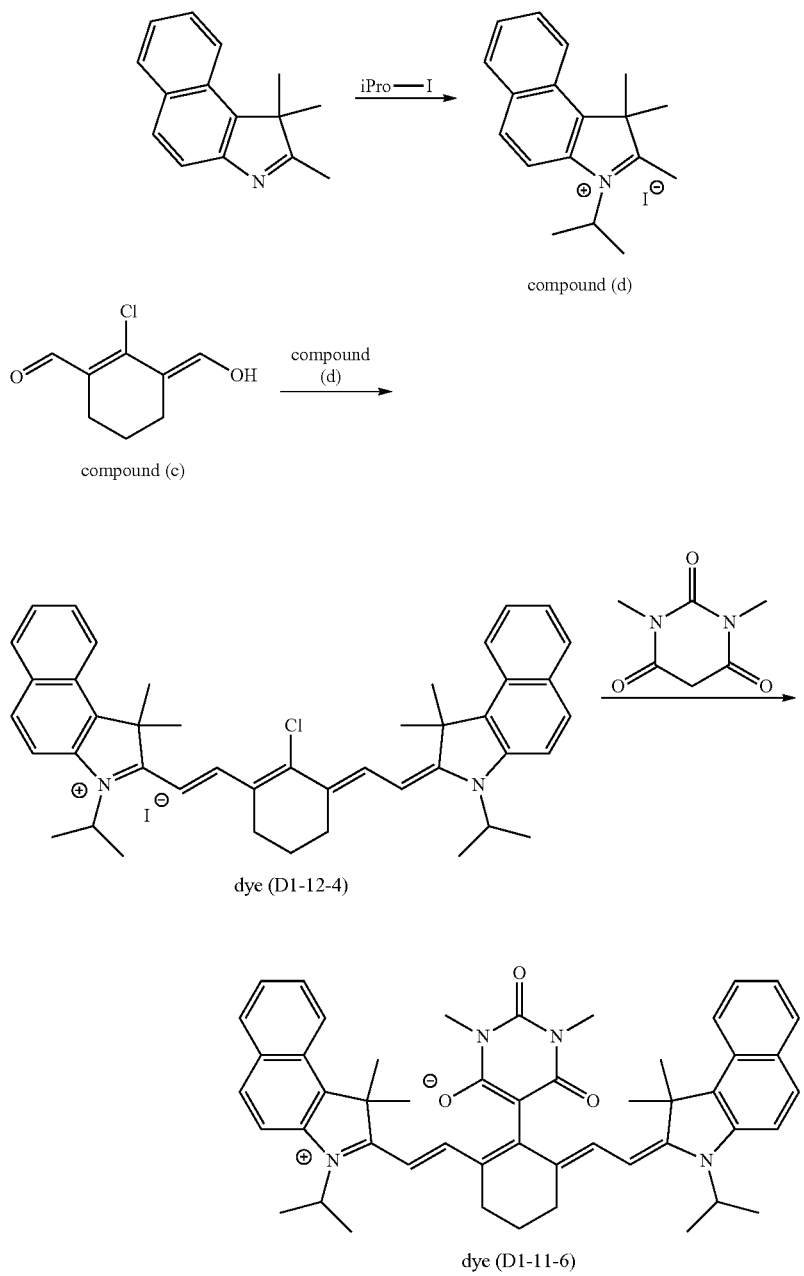

compound (d)

compound (c)

dye (D1-12-4)

dye (D1-11-6)

(Synthesis of Compound (d))

Into an eggplant flask, 50 g (0.24 mol) of 1,1,2-trimethyl-1H-benz[e]indole and 203 g (1.2 mol) of isopropyl iodide were fed, followed by 120-hour reflux stirring at 110° C. Thereafter, a precipitated solid was filtered out and the solid was washed with THF, and as a result, a 43.5 g (48% yield, 0.11 mol) of compound (d) was obtained.

(Synthesis of Dye (D1-12-4))

Into an eggplant flask, 3.0 g (0.017 mol) of the compound (c), 13.2 g (0.035 mol) of the compound (d), 60 cc of ethanol, 7.0 g (0.070 mol) of triethylamine, and 7.1 g (0.070 mol) of acetic anhydride were fed, followed by one-hour stirring at 50° C. Thereafter, a solvent was distilled off by an evaporator, followed by refining by a silica gel column chromatography method, and as a result, 4.0 g (30% yield, 0.0052 mol) of the dye (D1-12-4) was obtained.

(Synthesis of Dye (D1-11-6))

Into an eggplant flask, 3.0 g (0.0039 mol) of the dye (D1-12-4), 1.04 g (0.0066 mol) of 1,3-dimethylbarbituric acid, 0.49 g (0.0049 mol) of triethylamine, 40 cc of dichloromethane, and 40 cc of methanol were fed, followed by one-hour reflux stirring at 65° C. Thereafter, a solvent was distilled off followed by refining by a silica gel column chromatography method, and as a result, 1.5 g (50% yield, 0.0020 mol) of the dye (D1-11-6) was obtained.

(1-7) Manufacture of Dye (D1-22-4)

The dye (D1-22-4) was synthesized according to the following reaction path.

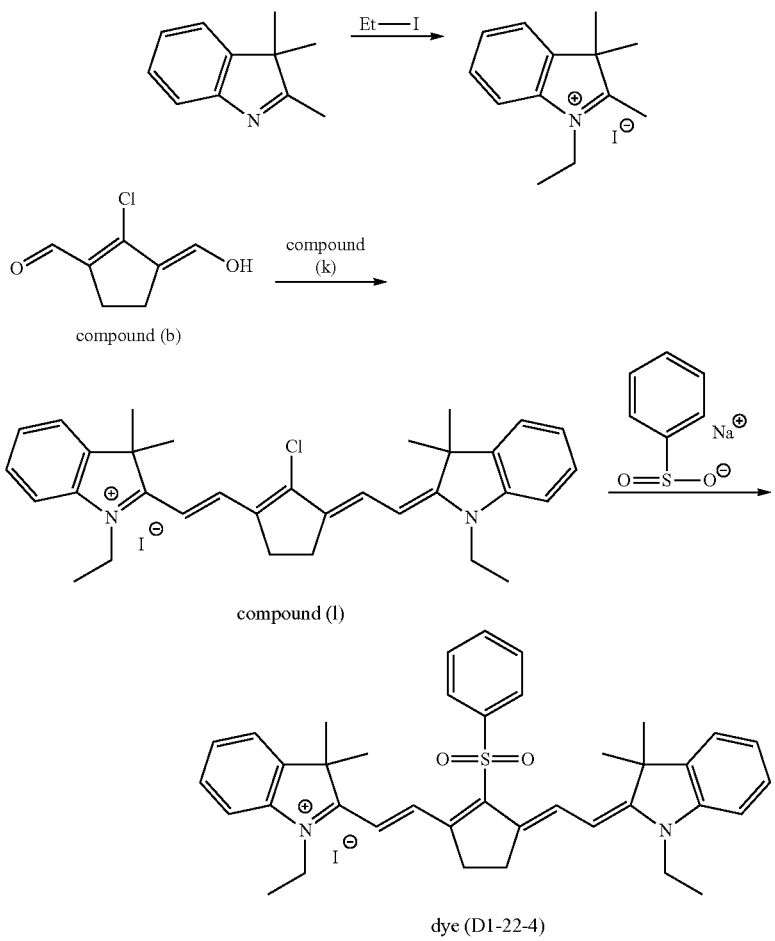

compound (b)

compound (l)

dye (D1-22-4)

(Synthesis of Compound (k))

Into an eggplant flask, 30 g (0.19 mol) of 2,3,3-trimethylindolenine and 117.5 g (0.75 mol) of ethyl iodide were fed, followed by two-day reflux stirring at 90° C. Thereafter, a precipitated solid was filtered out and the solid was washed with hexane, and as a result, a 56.8 g (96% yield, 0.18 mol) of compound (k) was obtained.

(Synthesis of Compound (l))

Into an eggplant flask, 3.0 g (0.019 mol) of the compound (b), 11.9 g (0.037 mol) of the compound (k), 60 cc of ethanol, 7.7 g (0.076 mol) of triethylamine, and 7.7 g (0.076 mol) of acetic anhydride were fed, followed by one-hour stirring at 50° C. Thereafter, a solvent was distilled off by an evaporator, followed by refining by a silica gel column chromatography method, and as a result, a 6.0 g (51% yield, 0.0097 mol) of compound (l) was obtained.

(Synthesis of Dye (D1-22-4))

Into an eggplant flask, 3.0 g (0.0048 mol) of the compound (l) and 40 cc of methanol were fed, followed by stirring, and 1.01 g (0.0050 mol) of sodium benzenesulfinate dihydrate was added to the mixture, followed by two-hour stirring under a nitrogen atmosphere. Thereafter, a solvent was distilled off, followed by refining by a silica gel column chromatography method, and as a result, 1.23 g (35% yield, 0.0017 mol) of the dye (D1-22-4) was obtained.

(2) Manufacture of Dyes (D2)

(2-1) Manufacture of Dye (D2-11a-7)

The dye (D2-11a-7) was manufactured by the method described in International Publication WO2014/088063. When a 350 to 800 nm wavelength light absorption spectrum of the dye (D2-11a-7) dissolved in dichloromethane was measured, $\lambda_{max}$ was 698 nm.

(2-2) Manufacture of Dye (D2-11b-1)

The dye (D2-11b-1) was manufactured according to the reaction formula (F1) by a well-known method. In the reaction formula (F1), $R^{21}$ is a methyl group, $R^{30}$ is an n-$C_8H_{17}$ group, and $R^{23}$ and $R^{26}$ are each a hydrogen atom. When a 350 to 800 nm wavelength light absorption spectrum of the dye (D2-11b-1) dissolved in dichloromethane was measured, $\lambda_{max}$ was 691 nm.

(F1)

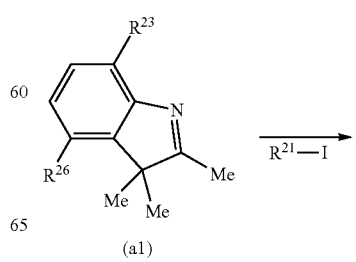

(a1)

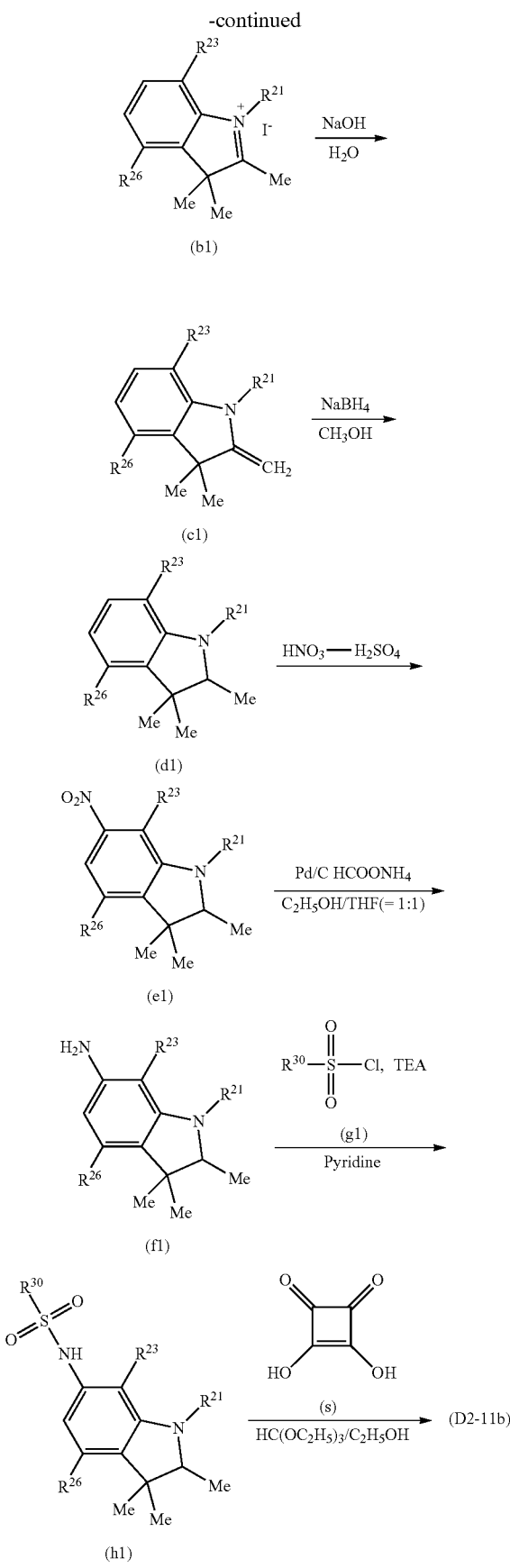

Test Examples 1 to 15; Fabrication and Evaluation of Absorption Layers

Absorption layers were fabricated using the various dyes synthesized or prepared in the above and a transparent resin, and their optical characteristics were evaluated. The test examples 1 to 13 are test examples according to the present filter, and the test examples 14, 15 are comparative test examples.

(Fabrication of Absorption Layers)

The dyes listed in Table 7 out of the dyes (D1), the dyes (D2), and the UV dye were adjusted to have the respective concentrations relative to a polyimide resin (JL-20) (part by mass to 100 parts by mass of the resin), cyclohexanone was further added, and they were dissolved by stirring at room temperature, whereby coating liquids were obtained. Similarly, the dyes listed in Table 8 out of the dyes (D1), the dyes (D2), and the UV dye were adjusted to have the respective concentrations relative to a polyimide resin (C3G30) (part by mass to 100 parts by mass of the resin), cyclohexanone was further added, and they were dissolved by stirring at room temperature, whereby coating liquids were obtained.

The obtained coating liquids were each applied on a 0.3 mm thick glass (manufactured by SCHOTT AG, brand name: D263) substrate by a spin coating method, and dried by heating, to form 1.1 to 1.3 μm thick absorption layers 1 to 15, whereby absorption layer-coated glass substrates each having one of the absorption layers 1 to 15 were obtained. The absorption layer obtained in the test example 1 will be referred to as the absorption layer 1. The same applies to the absorption layers obtained in the other test examples.

(Evaluation of Optical Characteristics)

Spectral transmittance curves for a 0° incident angle of the obtained absorption layer-coated glass substrates and glass substrates without the absorption layer were measured. From the measurement results of the absorption layer-coated glass substrates and the measurement results of the glass substrates without the absorption layer, (a-1) a transmittance for 700 nm wavelength light, (a-2) the minimum transmittance for 780 to 860 nm wavelength light, and (a-3) an average transmittance for 430 to 460 nm wavelength light were calculated as optical characteristics of each of the absorption layers 1 to 15. Specifically, influences of the absorption by the glass substrate and the reflection by an interface between the glass substrate and the absorption layer and an interface between the glass substrate and the air were subtracted, and the reflection by an interface between the absorption layer and the air was calculated. Table 7 and Table 8 show the results together with the structure of each of the absorption layers.

Figure 3:
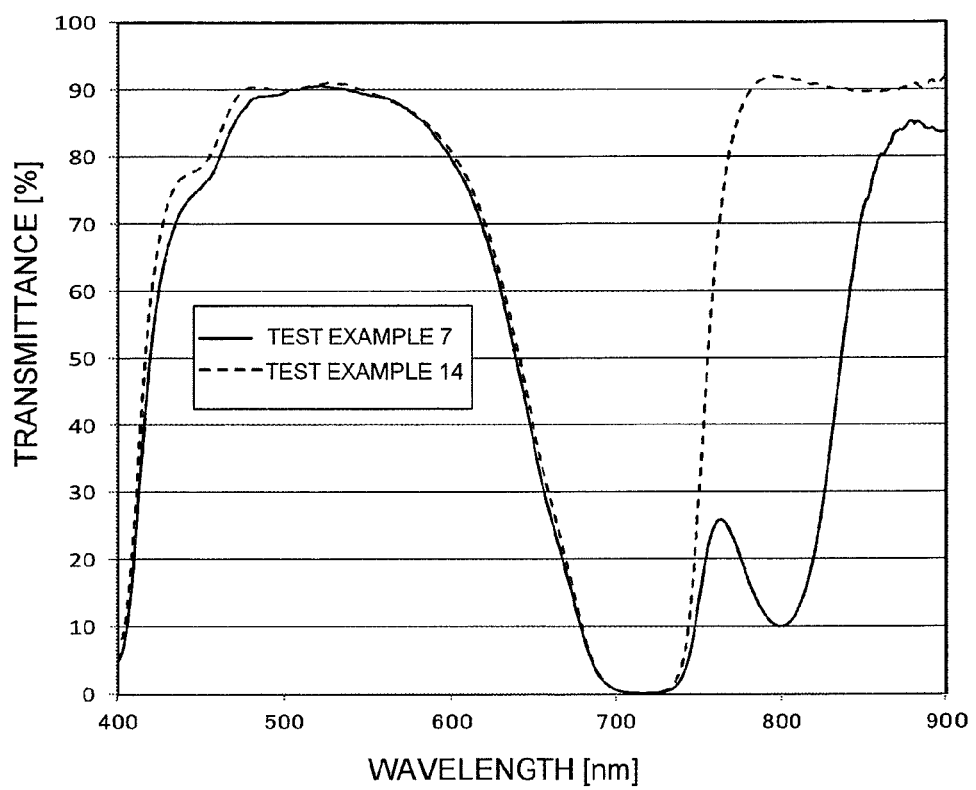
FIG. 3 is a chart illustrating spectral transmittance curves of absorption layers used in optical filters of examples.

Further, FIG. 3 illustrates the spectral transmittance curves for the 0° incident angle, of the absorption layer 7 obtained in the test example 7 and the absorption layer 14 obtained in the test example 14.

TABLE 7

| | | | | NIR dye | | | | | | |
|---|---|---|---|---|---|---|---|---|---|---|
| Test example | Kind of resin | Film thickness [μm] | Dye (D1) (abbreviation) | (D1) concentration [part by mass] | Dye (D2) (abbreviation) | (D2) concentration [part by mass] | UV dye (abbreviation) | UV dye concentration [part by mass] | 780 to 860 nm minimum transmittance [%] | 430 to 460 nm average transmittance [%] | 700 nm transmittance [%] |
| 1 | JL-20 | 1.2 | D1-11-2 | 4.5 | D2-11b-1 | 8.5 | M-2 | 4.5 | 25.1 | 69.2 | 0.5 |
| 2 | | 1.2 | D1-11-2 | 4.5 | D2-11b-1 | 6.0 | M-2 | 4.5 | 30.1 | 69.5 | 1.9 |
| 3 | | 1.2 | D1-11-6 | 4.5 | D2-11b-1 | 8.5 | M-2 | 4.5 | 26.0 | 69.8 | 0.7 |
| 4 | | 1.1 | D1-11-6 | 4.5 | D2-11b-1 | 6.0 | M-2 | 4.5 | 23.3 | 72.1 | 1.9 |

TABLE 8

| | | | | NIR dye | | | | | | |
|---|---|---|---|---|---|---|---|---|---|---|
| Test example | Kind of resin | Film thickness [μm] | Dye (D1) (abbreviation) | (D1) concentration [part by mass] | Dye (D2) (abbreviation) | (D2) concentration [part by mass] | UV dye (abbreviation) | UV dye concentration [part by mass] | 780 to 860 nm minimum transmittance [%] | 430 to 460 nm average transmittance [%] | 700 nm transmittance [%] |
| 5 | C3G30 | 1.2 | CroPyl | 4.5 | D2-11a-1 | 9 | M-2 | 4.5 | 18.5 | 68.6 | 0.7 |
| 6 | | 1.2 | D1-11-1 | 4.5 | D2-11a-1 | 9 | M-2 | 4.5 | 19.9 | 73.7 | 0.5 |
| 7 | | 1.2 | D1-11-2 | 4.5 | D2-11a-1 | 9 | M-2 | 4.5 | 10.1 | 74.2 | 0.6 |
| 8 | | 1.2 | D1-11-2 | 4.5 | D2-11b-1 | 9 | M-2 | 4.5 | 8.6 | 77.3 | 0.4 |
| 9 | | 1.3 | D1-11-3 | 4.5 | D2-11a-1 | 9 | M-2 | 4.5 | 8.0 | 70.7 | 0.3 |
| 10 | | 1.2 | D1-12-1 | 4.5 | D2-11a-1 | 9 | M-2 | 4.5 | 23.0 | 74.4 | 0.6 |
| 11 | | 1.2 | D1-12-2 | 4.5 | D2-11a-1 | 9 | M-2 | 4.5 | 14.8 | 71.4 | 0.6 |
| 12 | | 1.2 | D1-22-4 | 4.5 | D2-11a-1 | 9 | M-2 | 4.5 | 31.2 | 71.3 | 0.5 |
| 13 | | 1.2 | SD-AG01 | 4.5 | D2-11a-1 | 9 | M-2 | 4.5 | 38.1 | 73.5 | 0.6 |
| 14 | | 1.2 | — | 0 | D2-11a-1 | 9 | M-2 | 4.5 | 89.4 | 78.1 | 0.6 |
| 15 | | 1.2 | — | 0 | D2-11b-1 | 9 | M-2 | 4.5 | 88.8 | 80.8 | 0.7 |

As is apparent from Table 7, Table 8, and FIG. 3, the absorption layers 1 to 13 obtained in the test examples 1 to 13 each contain the dye (D1) and satisfy the requirements (iv-1) to (iv-3). The absorption layers 14, 15 obtained in the test examples 14, 15, which do not contain the dye (D1), do not satisfy the requirement (iv-3) out of the requirements (iv-1) to (iv-3).

Examples 1 to 8; Manufacture and Evaluation of NIR Filters (Manufacture of NIR Filters)

TiO$_2$ films and SiO$_2$ films were alternately stacked on a 0.3 mm thick glass (D263) substrate by a vapor deposition method to form a reflection layer X consisting of a dielectric multilayer film whose total number of stacked films was 52. The structure of the reflection layer X was found so as to satisfy the aforesaid requirements (vi-1) and (vi-2) in its spectral transmittance curves for a 0° incident angle and a 30° incident angle, through simulation using the number of the stacked films of the dielectric multilayer film, the film thickness of the TiO$_2$ film, and the film thickness of the SiO$_2$ film as parameters. As for the requirement (vi-2), the absorption layers 6 to 12 were used as references.

Figure 4:
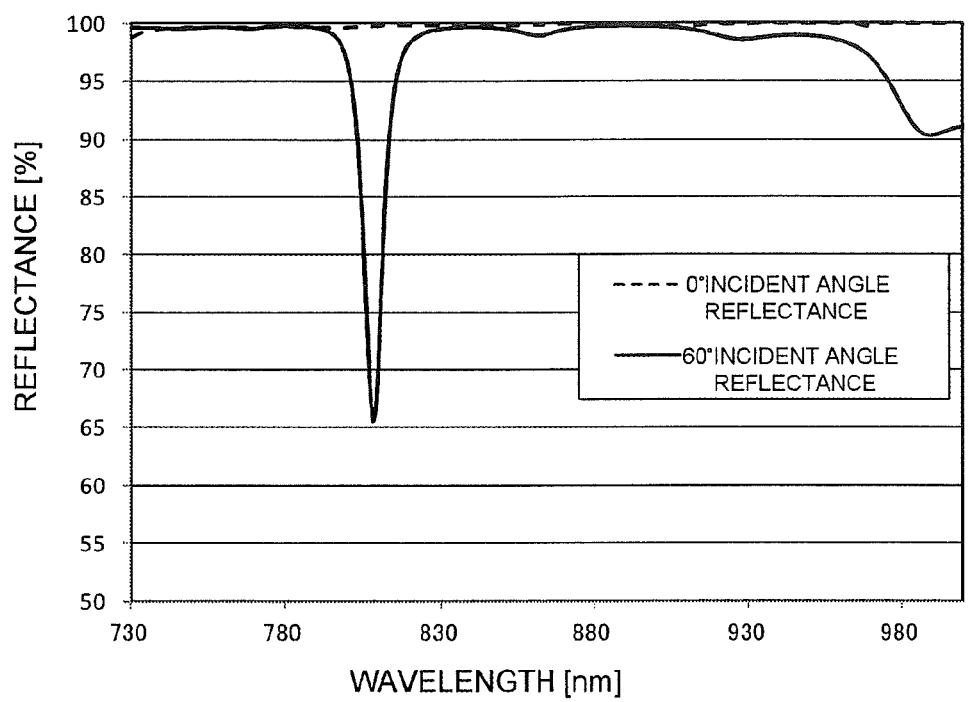
FIG. 4 is a chart illustrating spectral transmittance curves of reflection layers used in optical filters of examples.

Table 9 shows the transmittance and the reflectance of the reflection layer X for each predetermined wavelength region when the incident angle is 0° to 60°. Further, FIG. 4 illustrates spectral transmittance curves for 730 to 1000 nm wavelength light when the incident angle is 0° and 60°, as measured on the film surface of the reflection layer X. As is apparent from Table 9 and FIG. 4, the reflection layer X has characteristics that its minimum reflectance for 730 to 900 nm wavelength light is lower by 3% or more when the incident angle is 60° than when the incident angle is 0°.

TABLE 9

| Incident angle | 0 deg | 10 deg | 20 deg | 30 deg | 40 deg | 50 deg | 60 deg |
|---|---|---|---|---|---|---|---|
| 420 to 600 nm average transmittance [%] | 93.3 | 93.5 | 93.7 | 92.4 | 89.6 | 83.5 | 74.4 |
| 430 to 620 nm average transmittance [%] | 93.3 | 93.5 | 93.7 | 92.9 | 90.0 | 84.3 | 72.3 |
| 730 to 900 nm average transmittance [%] | 0.0 | 0.0 | 0.0 | 0.0 | 0.1 | 0.4 | 1.9 |
| 730 to 900 nm maximum transmittance [%] | 0.9 | 0.5 | 0.1 | 0.1 | 1.6 | 7.6 | 34.0 |
| 730 to 900 nm average reflectance [%] | 99.7 | 99.7 | 99.8 | 99.8 | 99.7 | 99.4 | 97.9 |

TABLE 9-continued

| Incident angle | 0 deg | 10 deg | 20 deg | 30 deg | 40 deg | 50 deg | 60 deg |
| --- | --- | --- | --- | --- | --- | --- | --- |
| 730 to 900 nm minimum reflectance [%] | 98.8 | 99.2 | 99.6 | 99.6 | 98.4 | 92.3 | 65.6 |

Next, similarly to the above-described test examples, the absorption layers 6 to 8, 10 to 12, 14, and 15 were each formed on a main surface of the aforesaid glass substrate opposite to its main surface where the reflection layer was formed, further TiO$_2$ films and SiO$_2$ films were alternately stacked on the surface of the absorption layer by a vapor deposition method as in the case of the reflection layer, to form an antireflection layer, whereby optical filters 1 to 8 were obtained. Note that the optical filter obtained in Example 1 will be referred to as the optical filter 1. The same applies to the optical filters obtained in the other examples.

The antireflection layer was also decided through simulation so as to have desired optical characteristics, using the number of the stacked films of the dielectric multilayer film, the film thickness of the TiO$_2$ film, and the film thickness of the SiO$_2$ film as parameters.

(Evaluation of NIR Filters)
(1) Optical Characteristics

Figure 5A:
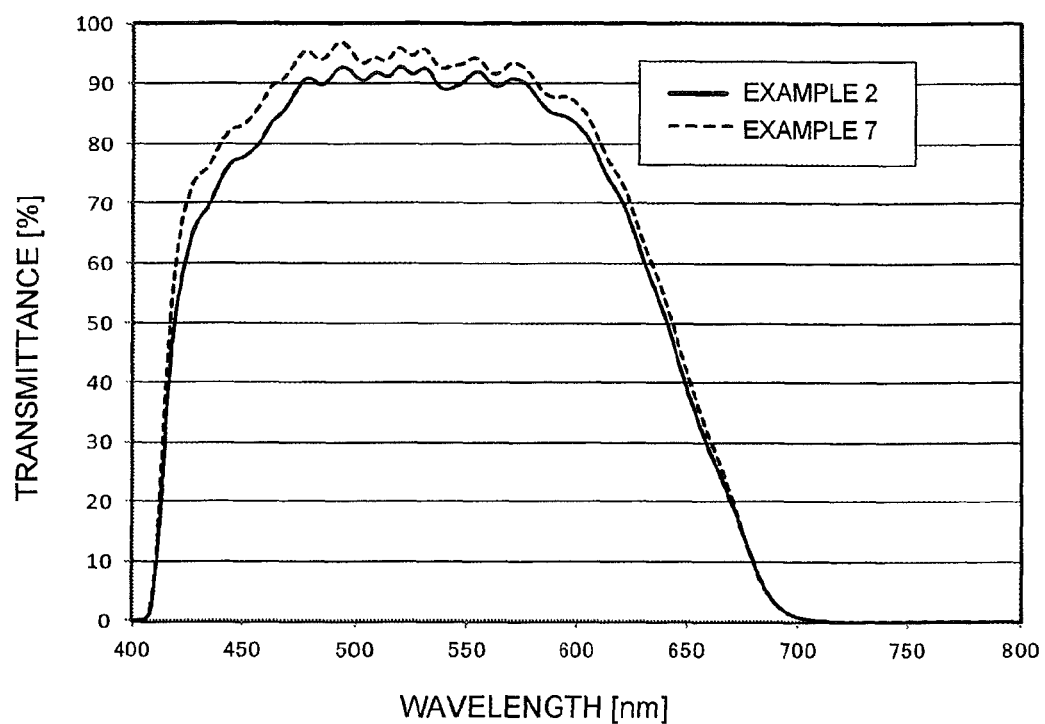
FIG. 5A is a chart illustrating spectral transmittance curves measured in optical filters obtained in examples.
Figure 5B:
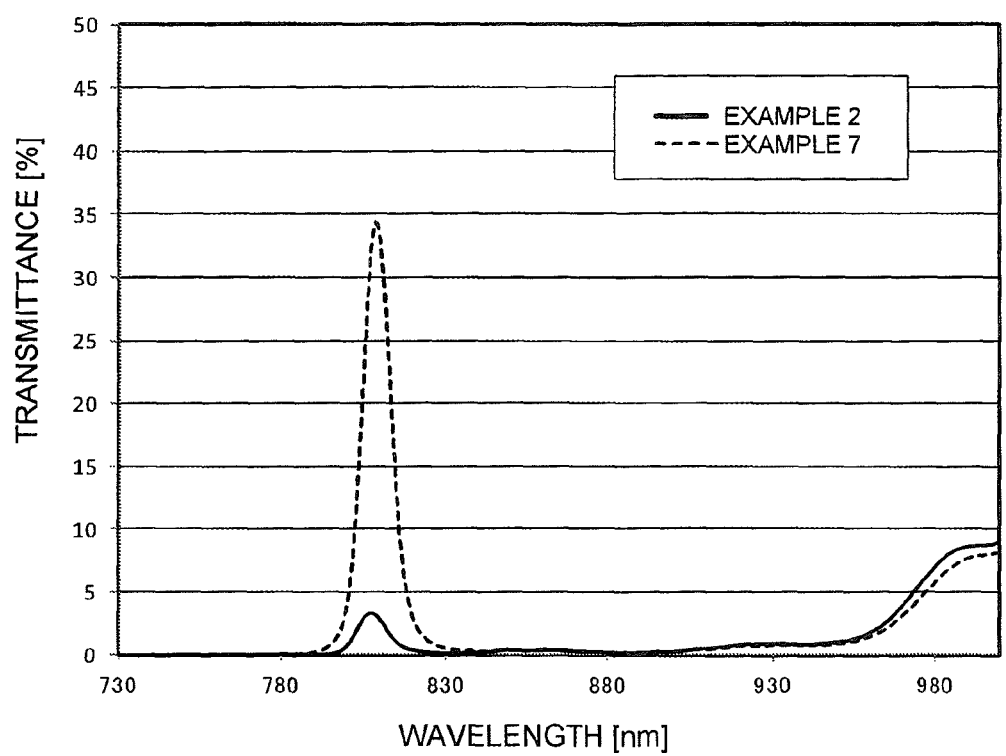
FIG. 5B is a chart illustrating spectral transmittance curves for a 60° incident angle, as measured in the optical filters in the examples.

Spectral transmittance curves (0°, 30°, and 60° incident angles) of the fabricated optical filters 1 to 8 were measured, and Table 10 shows the results calculated from the measurement results together with the kind of each of the absorption layers. Further, FIG. 5A and FIG. 5B illustrate the spectral transmittance curves of the optical filters 2 and 7 obtained in Example 2 and Example 7. FIG. 5A illustrates the spectral transmittance curves when the incident angle is 0°, and FIG. 5B illustrates the spectral transmittance curves when the incident angle is 60°.

Note that in Table 10, "average transmittance (430-620 nm)" at the 0° incident angle is an average transmittance for 430 to 620 nm wavelength light, and "50% transmittance wavelength" is a wavelength exhibiting a 50% transmittance in a 600 to 700 nm wavelength region.

The "average transmittance shift amount (380-425 nm)" is an average value of absolute values of differences in transmittance in a 380 to 425 nm wavelength region between a spectral transmittance curve when the incident angle is 0° and that when the incident angle is 30°. Similarly, the "average transmittance shift amount (615-725 nm)" is an average value of absolute values of differences in transmittance in a 615 to 725 nm wavelength region between the spectral transmittance curve when the incident angle is 0° and that when the incident angle is 30°.

Further, in Table 10, "maximum transmittance (730-1000 nm)" at the 60° incident angle is the maximum transmittance for 730 to 1000 nm wavelength light.

(2) Light Fastness

The fabricated optical filters 1 to 6 were subjected to a light fastness test to be evaluated. In the light fastness test, the optical filters were intermittently irradiated with light under the following condition, using Super Xenon Weather Meter SX75 (manufactured by Suga Test Instruments Co., Ltd., product name).

wavelength: 300 to 2450 nm
accumulated light quantity: 31.4 kJ/cm$^2$

Before and after the irradiation, the spectral transmittance curve (0° incident angle) was measured, the minimum transmittance for 780 to 870 nm wavelength light was found before and after the irradiation, and a variation amount was calculated by the following equation. Table 10 also shows the results.

minimum transmission variation [%]=(minimum transmittance for 780 to 870 nm wavelength light after irradiation)−(minimum transmittance for 780 to 870 nm wavelength light before irradiation)

TABLE 10

| | | | 0° incident angle | | 0°, 30° incident angles | | 60° incident angle | |
| --- | --- | --- | --- | --- | --- | --- | --- | --- |
| Example | Absorption layer | Reflection layer | average transmittance (430-620 nm) [%] | 50% transmittance wavelength [nm] | average transmittance shift amount (380-425 nm) [%/nm] | average transmittance shift amount (615-725 nm) [%/nm] | maximum transmittance (730-1000 nm) [%] | minimum transmittance variation [%] |
| 1 | 6 | Reflection layer X | 82.3 | 634.7 | 4.5 | 1.6 | 9.7 | 4.4 |
| 2 | 7 | | 86.0 | 640.0 | 4.3 | 1.8 | 8.9 | 0.4 |
| 3 | 8 | | 84.7 | 629.8 | 4.1 | 1.4 | 9.0 | −0.2 |
| 4 | 10 | | 83.4 | 637.5 | 4.3 | 1.7 | 11.9 | 4.5 |
| 5 | 11 | | 83.0 | 638.1 | 4.0 | 1.5 | 8.3 | 5.3 |
| 6 | 12 | | 77.1 | 636.8 | 4.2 | 1.6 | 13.0 | 9.5 |
| 7 | 14 | | 89.8 | 642.4 | 4.9 | 1.6 | 34.4 | — |
| 8 | 15 | | 89.6 | 636.5 | 4.8 | 1.6 | 36.8 | — |

As is apparent from Table 10, the optical filters 1 to 6 obtained in Examples 1 to 6 all satisfied the aforesaid requirements (i-1) to (i-3). That is, they were optical filters whose transmitting characteristics for visible light is good and whose blocking characteristics for near-infrared light is less dependent on the incident angle, in particular, whose blocking characteristics for near-infrared light with a high incident angle deteriorates less. Further, it is seen that, among the dyes (D1), the dye (D1-11) is preferable, and the dye (D1-11-2) being the dye (D1-11) in which m is 1 is more preferable, in view of light fastness. On the other hand, the optical filters 7, 8 obtained in Examples 7, 8 do not have sufficient blocking characteristics for near-infrared light with a high incident angle.

The optical filter of the present invention has good transmitting characteristics for visible light and has good blocking characteristics for near-infrared light, with its blocking characteristics for near-infrared light with a high incident angle deteriorating less, and thus is useful for the application in an imaging device such as a digital still camera whose performance has recently been getting higher.

What is claimed is:

1. An optical filter, comprising:
   an absorption layer and
   a reflection layer,
   wherein the optical filter satisfies requirements (i-1), (i-2), and (i-3):
   (i-1) in a spectral transmittance curve for a 0° incident angle, an average transmittance for 430 to 620 nm wavelength light is 65% or more, and a wavelength exhibiting a 50% transmittance is in a 600 to 700 nm wavelength region;
   (i-2) in a 615 to 725 nm wavelength region, an average value of absolute values of differences in transmittance between the spectral transmittance curve for the 0° incident angle and a spectral transmittance curve for a 30° incident angle is 8%/nm or less; and
   (i-3) in a spectral transmittance curve for a 60° incident angle, a maximum transmittance for 730 to 1000 urn wavelength light is 15% or less.

2. The optical filter according to claim 1, wherein a minimum reflectance of the reflection layer for 730 to 900 nm wavelength light is lower by 3% or more when an incident angle is 60° than when the incident angle is 0°.

3. The optical filter according to claim 1,
   wherein a spectral transmittance curve of the absorption layer for a 0° incident angle satisfies requirement (iv-1) to (iv-3):
   (iv-1) a transmittance for 700 nm wavelength light is 5% or less;
   (iv-2) a minimum transmittance for 780 to 860 nm wavelength light is 50% or less; and
   (iv-3) an average transmittance for 430 to 460 nm wavelength light is 60% or more.

4. The optical filter according to claim 1,
   wherein the absorption layer comprises a dye (D1) whose light absorption spectrum measured when the dye (D1) is dissolved in dichloromethane satisfies requirements (ii-1) and (ii-2):
   (ii-1) at least one absorption maximum wavelength is in a 760 to 875 nm wavelength region; and
   (ii-2) when a transmittance for a largest absorption wavelength in the 760 to 875 nm wavelength region is 10%, a wavelength exhibiting an 80% transmittance is in a 650 to 800 nm wavelength region.

5. The optical filter according to claim 4,
   wherein the dye (D1) comprises at least one selected from the group consisting of a cyanine-based compound, a cloconium-based compound, a phthalocyanine-based compound, a squarylium-based compound, and a diketopyrrolopyrrole-based compound.

6. The optical filter according to claim 4,
   wherein the dye (D1) comprises a cyanine-based compound represented by formula (D1-1):

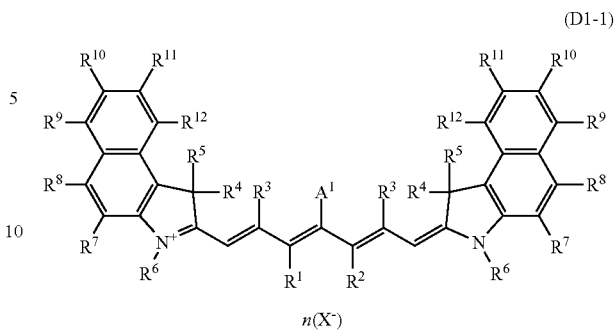

(D1-1)

wherein:
$R^1$ to $R^{12}$ each independently represent a hydrogen atom, a halogen atom, an alkyl group having 1 to 15 carbon atoms which may have a substituent, or an aryl group having 5 to 20 carbon atoms:
$R^1$ and $R^2$ may couple together to form a 5-membered ring, a 6-membered ring, or a 7-membered ring, in which case, a hydrogen atom bonded to a carbon ring may be substituted by an alkyl group having 1 to 20 carbon atoms or an aryl group having 6 to 30 carbon atoms; and
$X^-$ represents a monovalent anion, and n represents a number of $X^-$ and is 0 or 1, and
wherein:
when n is 0, $A^1$ represents an anionic group represented by one selected from formulas (A1) to (A6); and
when n is 1, $A^1$ represents a halogen atom or $—X-A^2$ wherein X is a single bond, an ether bond, a sulfonyl bond, an ester bond, or a ureide bond, and $A^2$ is an alkyl group having 1 to 20 carbon atoms or an aryl group having 6 to 30 carbon atoms,

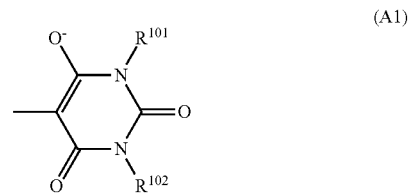

(A1)

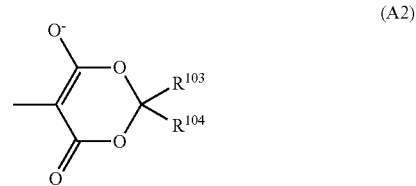

(A2)

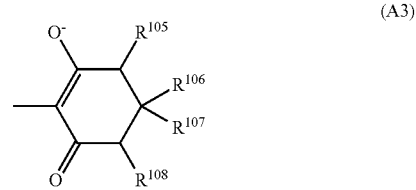

(A3)

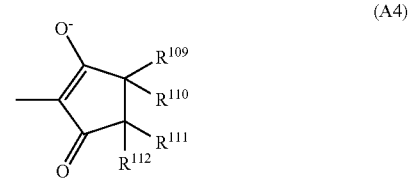

(A4)

-continued

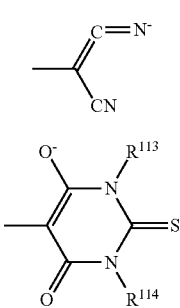

wherein:

$R^{101}$ to $R^{114}$ in formulas (A1) to (A6) each represent a hydrogen atom, an aryl group having 5 to 20 carbon atoms, or an alkyl group having 1 to 10 carbon atoms which may have a substituent.

7. The optical filter according to claim 6, wherein the cyanine-based compound is a cyanine-based compound represented by formula (D1-11):

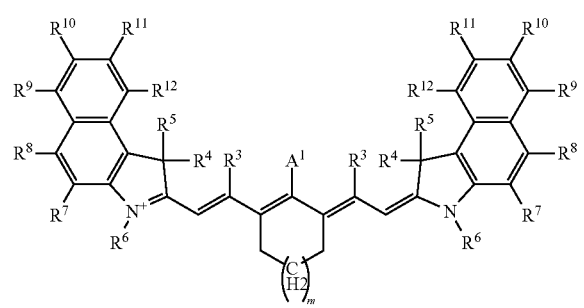

wherein:

$R^3$ to $R^{12}$ each independently represent a hydrogen atom, a halogen atom, or an alkyl group having 1 to 10 carbon atoms which may have a substituent;

m represents an integer from 0 to 2, and a hydrogen atom bonded to a carbon ring including $—(CH_2)_m—$ may be substituted by an alkyl group having 1 to 20 carbon atoms or an aryl group having 6 to 30 carbon atoms; and $A^1$ represents an anionic group represented by one selected from (A1) to (A6).

8. The optical filter according to claim 4, wherein the absorption layer comprises a transparent resin.

9. The optical filter according to claim 8, wherein the transparent resin comprises at least one selected from the group consisting of an acrylic resin, an epoxy resin, an ene-thiol resin, a polycarbonate resin, a polyether resin, a polyarylate resin, a polysulfone resin, a polyethersulfone resin, a polyparaphenylene resin, a polyarylene ether phosphine oxide resin, a polyimide resin, a polyamide-imide resin, a polyolefin resin, a cyclic olefin resin, and a polyester resin.

10. The optical filter according to claim 8, wherein the transparent resin has a glass transition temperature of 140° C. or more.

11. The optical filter according to claim 8, wherein the absorption layer comprises the dye (D1) by 0.01 to 30 parts by mass to 100 parts by mass of the transparent resin.

12. The optical filter according to claim 4, wherein the absorption layer further comprises a dye (D2) satisfying (iii-1):

(iii-1) in a 350 to 800 nm wavelength light absorption spectrum measured when the dye (D2) is dissolved in dichloromethane, a largest absorption wavelength is in a 600 to 750 nm wavelength region.

13. The optical filter according to claim 12, wherein the dye (D2) comprises a squarylium-based compound represented by formula (D2-1):

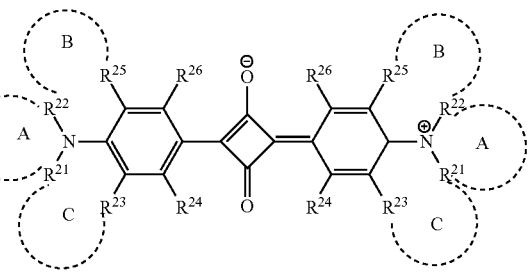

wherein:

$R^{24}$ and $R^{26}$ each independently represent a hydrogen atom, a halogen atom, a hydroxyl group, an alkyl group or alkoxy group having 1 to 6 carbon atoms, an acyloxy group having 1 to 10 carbon atoms, $—NR^{27}R^{28}$ wherein $R^{27}$ and $R^{28}$ each independently represent a hydrogen atom, an alkyl group having 1 to 20 carbon atoms, $—C(=O)—R^{29}$ wherein $R^{29}$ is a hydrogen atom, an alkyl group having 1 to 20 carbon atoms or an aryl group having 6 to 11 carbon atoms which may have a substituent, or an alanyl group having 7 to 18 carbon atoms which may have a substituent and which may have an oxygen atom between carbon atoms, $—NHR^{30}$, or $—SO_2—R^{30}$ wherein $R^{30}$ each is a hydrocarbon group having 1 to 25 carbon atoms in which one or more hydrogen atoms may be substituted by a halogen atom, a hydroxyl group, a carboxy group, a sulfo group, or a cyano group and in which an unsaturated bond, an oxygen atom, or a saturated or unsaturated ring structure may be included between carbon atoms, or a group represented by formula (S) wherein $R^{41}$ and $R^{42}$ each independently represent a hydrogen atom, a halogen atom, or an alkyl group or alkoxy group having 1 to 10 carbon atoms, and k is 2 or 3:

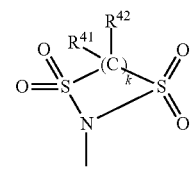

wherein constituents in at least one group of $R^{21}$ and $R^{22}$, $R^{22}$ and $R^{25}$, and $R^{21}$ and $R^{23}$ couple together to form a heterocycle A, a heterocycle B, or a heterocycle C having 5 or 6 members comprising a nitrogen atom, wherein, $R^{21}$ and $R^{22}$ when the heterocycle A is formed represent, as a bivalent group -Q- in which they are bonded, an alkylene group or an alkyleneoxy group, in which a hydrogen atom may be substituted by an alkyl group having 1 to 6 carbon atoms, an aryl group having 6 to 10 carbon atoms, or an acyloxy group having 1 to 10 carbon atoms which may have a substituent, wherein, $R^{22}$ and $R^{25}$ when the heterocycle B is formed and $R^{21}$ and $R^{23}$ when the heterocycle C is formed represent, each as a bivalent group —$X^1$—$Y^1$— and —$X^2$—$Y^2$— in which they are bonded wherein the side bonded to nitrogen is $X^1$ or $X^2$, a group in which each of $X^1$ and $X^2$ is represented by formula (1x) or (2x) and a group in which each of $Y^1$ and $Y^2$ is represented by one selected from formulas (1y) to (5y), and when each of $X^1$ and $X^2$ is a group represented by formula (2x), $Y^1$ and $Y^2$ may each be a single bond, in which case $X^1$ and $X^2$ may have an oxygen atom between carbon atoms,

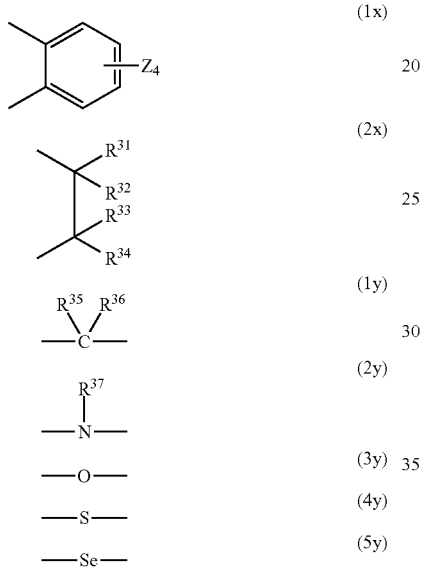

wherein:

four Zs in the formula (1x) each independently represent a hydrogen atom, a hydroxyl group, an alkyl group or alkoxy group having 1 to 6 carbon atoms, or —$NR^{38}R^{39}$ wherein $R^{38}$ and $R^{39}$ each independently represent a hydrogen atom or an alkyl group having 1 to 20 carbon atoms, and $R^{31}$ to $R^{36}$ each independently represent a hydrogen atom, an alkyl group having 1 to 6 carbon atoms, or an aryl group having 6 to 10 carbon atoms, and $R^{37}$ represents an alkyl group having 1 to 6 carbon atoms or an aryl group having 6 to 10 carbon atoms, wherein $R^{27}$, $R^{28}$, $R^{29}$, $R^{24}$, $R^{26}$, and $R^{31}$ to $R^{37}$ and $R^{21}$ to $R^{23}$ and $R^{25}$ when heterocycles are not formed, may be bonded to any other one of them to form a 5-membered ring or a 6-membered ring, and $R^{31}$ and $R^{36}$ and $R^{31}$ and $R^{37}$ may be bonded directly to each other, and wherein $R^{21}$ and $R^{22}$ when heterocycles are not formed, each independently represent a hydrogen atom, an alkyl group or allyl group having 1 to 6 carbon atoms which may have a substituent, or an aryl group or alaryl group having 6 to 11 carbon atoms, and $R^{23}$ and $R^{25}$ when the heterocycles are not formed, each independently represent a hydrogen atom, a halogen atom, or an alkyl group or alkoxy group having 1 to 6 carbon atoms.

14. The optical filter according to claim 1, wherein the absorption layer further comprises an ultraviolet absorbing dye satisfying requirement (v-1):
(v-1) in a 350 to 800 nm wavelength absorption spectrum measured when the ultraviolet absorbing dye (U) is dissolved in dichloromethane, a largest absorption wavelength is in a 360 to 415 nm wavelength region.

15. The optical filter according to claim 1, the optical filter further satisfying requirement (i-4),
(i-4) in a 380 to 425 nm wavelength region, an average value of absolute values of differences in transmittance between the spectral transmittance curve for the 0° incident angle and the spectral transmittance curve for the 30° incident angle is 8%/nm or less.

16. The optical filter according to claim 1, the optical filter further satisfying one or more selected from requirements (i-5), (i-6), and (i-7):
(i-5) in the spectral transmittance curve for the 0° incident angle, a wavelength exhibiting a 50% transmittance is in a 400 to 425 nm wavelength region;
(i-6) in the spectral transmittance curve for the 0° incident angle, an average transmittance for 350 to 395 nm wavelength light is 2% or less; and
(i-7) in the spectral transmittance curve for the 0° incident angle, an average transmittance for 710 to 1100 nm wavelength light is 2% or less.

17. The optical filter according to claim 1, wherein the reflection layer satisfies requirements (vi-1) and (vi-2):
(vi-1) in spectral transmittance curves for a 0° incident angle and a 30° incident angle, a transmittance for 420 to 600 nm wavelength light is 85% or more; and
(vi-2) in the spectral transmittance curves for the 0° incident angle and the 30° incident angle, a transmittance for a $\lambda_b$ nm to 1100 nm wavelength region is 1% or less where $\lambda_b$ is the longest wavelength for which a transmittance of the absorption layer for 650 to 800 nm wavelength light becomes 1%.

18. The optical filter according to claim 1, wherein the absorption layer is a resin substrate.

19. The optical filter according to claim 1, further comprising:
a transparent substrate transmitting visible light, wherein the absorption layer is disposed on a main surface of the transparent substrate.

20. The optical filter according to claim 1, wherein the absorption layer comprises a glass layer having a minimum transmittance of 80% or less for a wavelength in a 750 to 900 nm wavelength region.

21. An imaging device, comprising:
the optical filter according to claim 1.

* * * * *